Nov. 11, 1924.  1,515,450
F. L. O. WADSWORTH
METHOD AND APPARATUS FOR THE MANUFACTURE OF GLASS PLATES
Filed Nov. 29, 1918   6 Sheets-Sheet 1
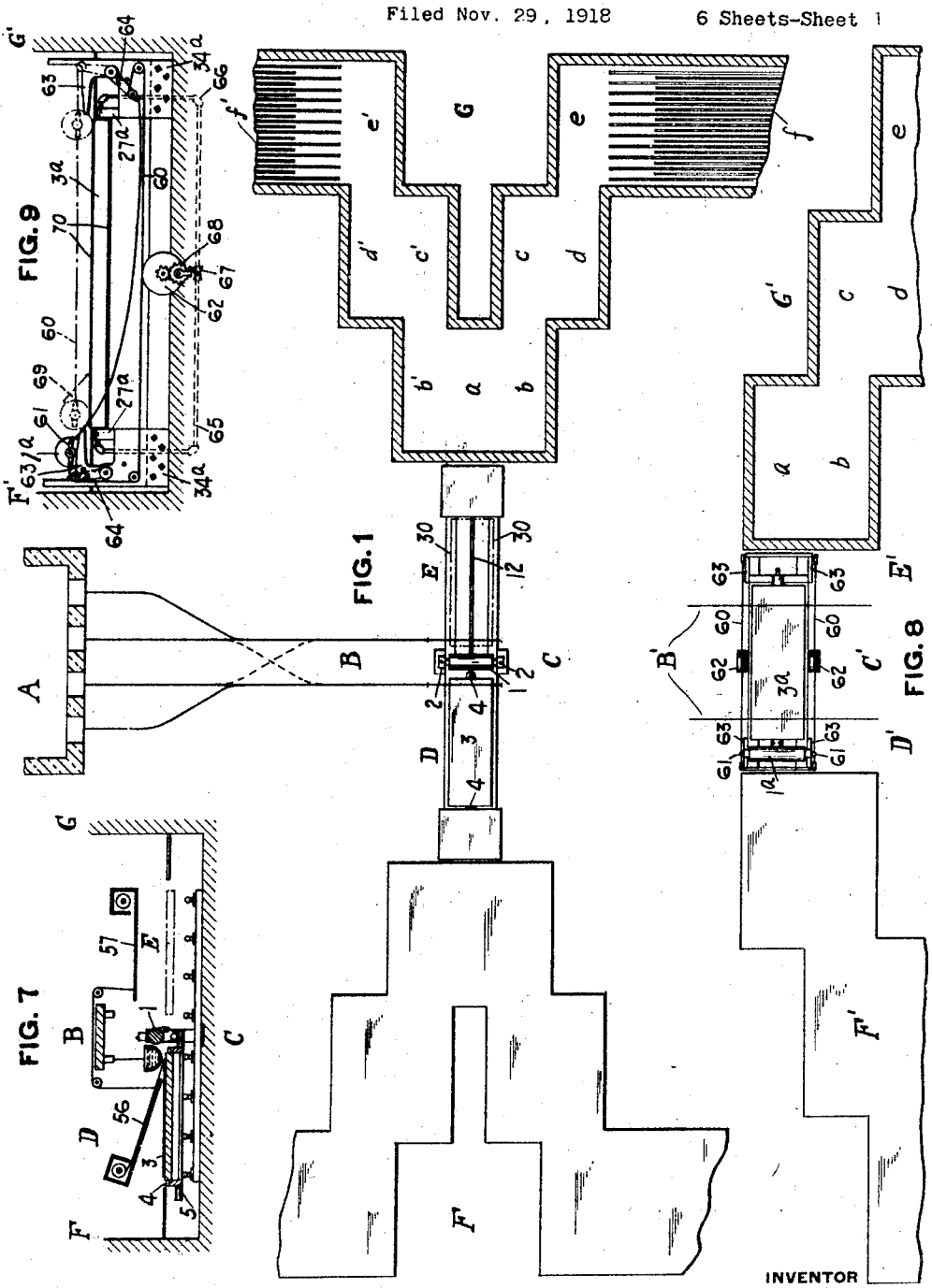
INVENTOR
F. L. O. Wadsworth Nov. 11, 1924.
F. L. O. WADSWORTH
1,515,450
METHOD AND APPARATUS FOR THE MANUFACTURE OF GLASS PLATES
Filed Nov. 29, 1918
6 Sheets-Sheet 2
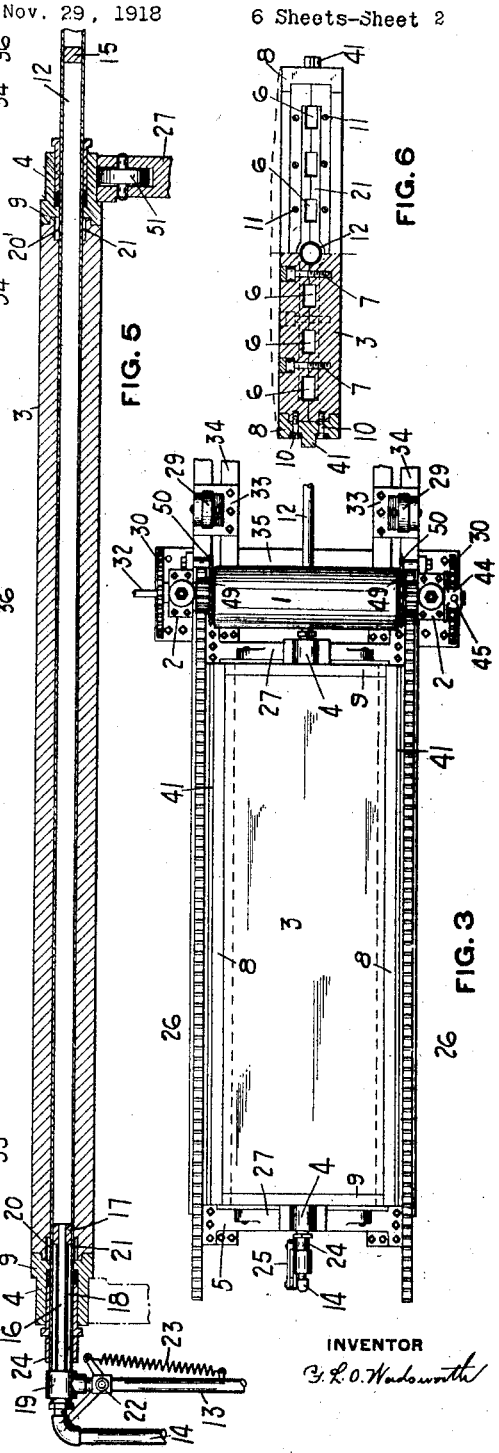

Nov. 11, 1924. 1,515,450
F. L. O. WADSWORTH
METHOD AND APPARATUS FOR THE MANUFACTURE OF GLASS PLATES
Filed Nov. 29, 1918 6 Sheets-Sheet 3
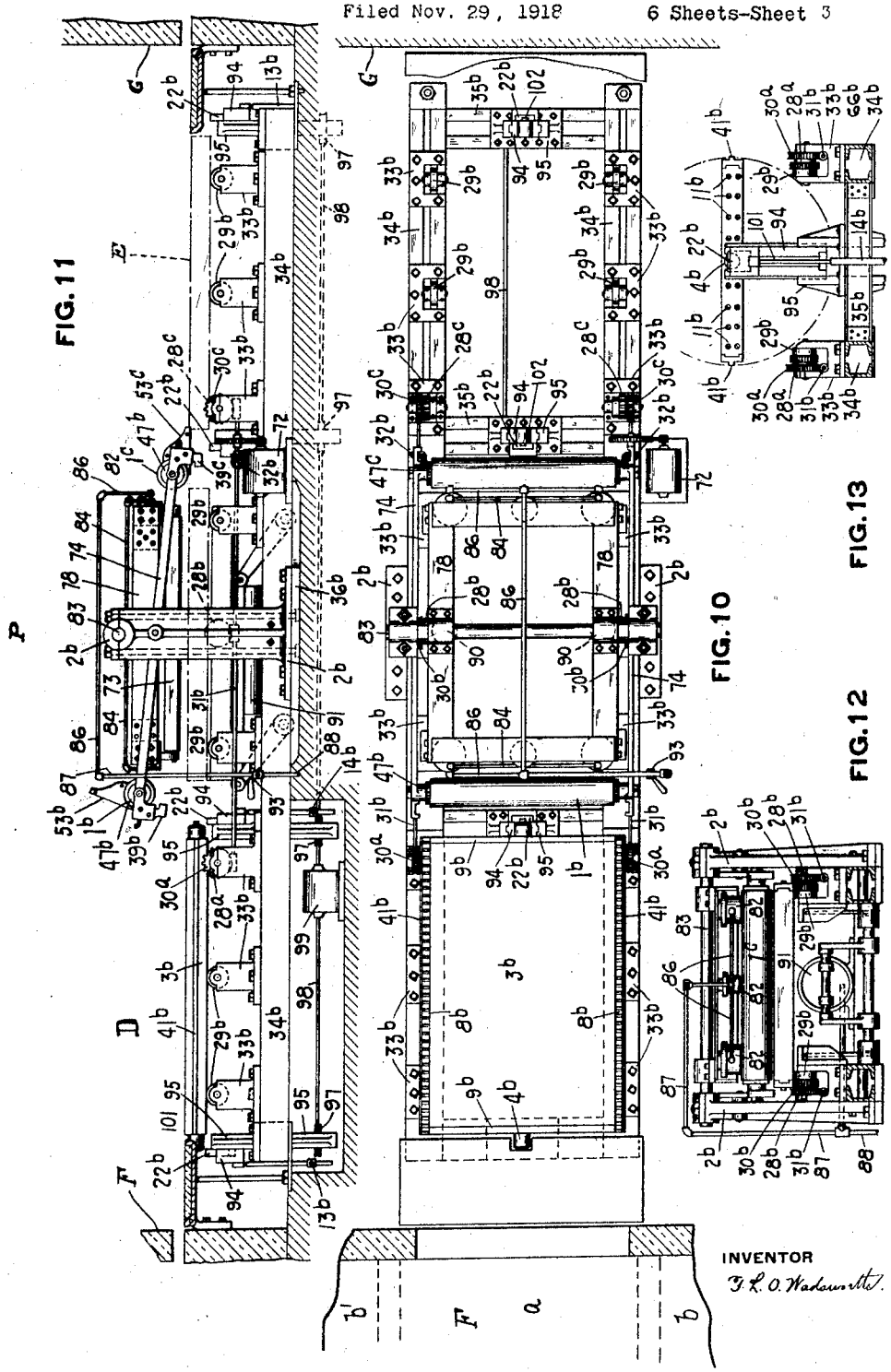
INVENTOR
F. L. O. Wadsworth.

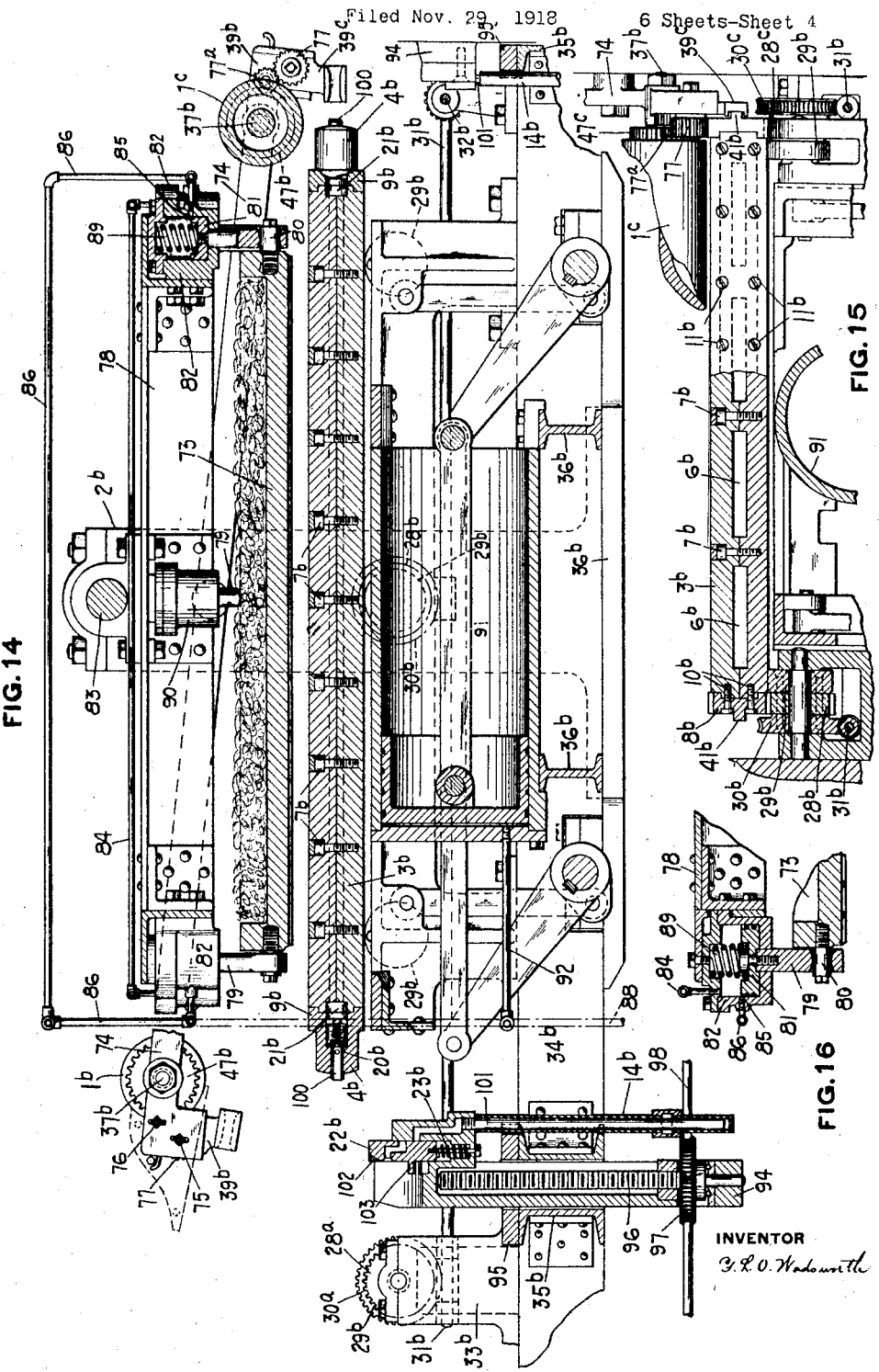

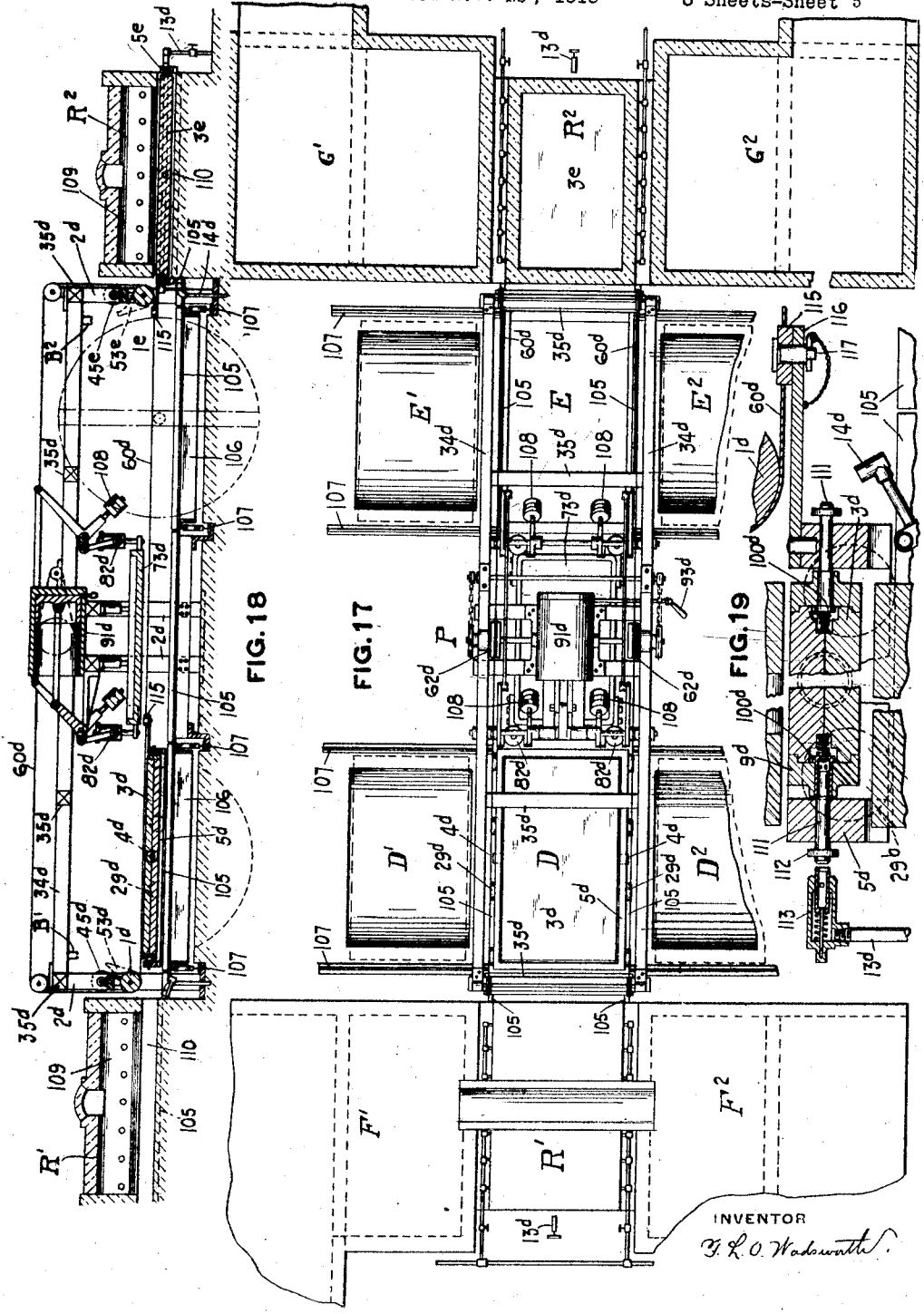

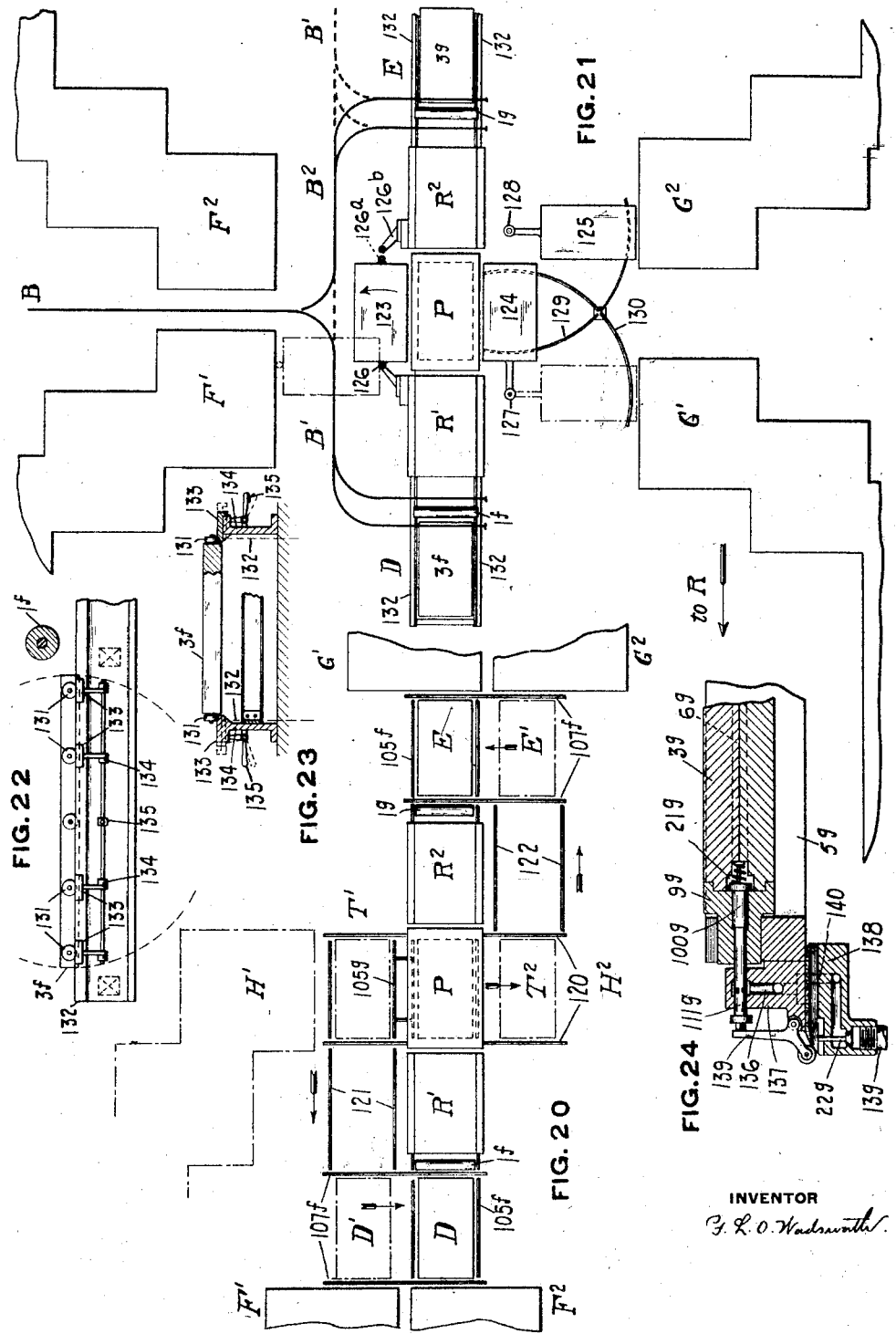

Patented Nov. 11, 1924.

1,515,450

UNITED STATES PATENT OFFICE.

FRANK L. O. WADSWORTH, OF PITTSBURGH, PENNSYLVANIA.

METHOD AND APPARATUS FOR THE MANUFACTURE OF GLASS PLATES.

Application filed November 29, 1918. Serial No. 264,569.

*To all whom it may concern:*

Be it known that I, FRANK L. O. WADSWORTH, a citizen of the United States, residing at Pittsburgh, in the county of Allegheny, State of Pennsylvania, have invented a new and useful Method and Apparatus for the Manufacture of Glass Plates, of which the following is a specification.

My invention relates to the manufacture of plate glass and sheet glass of various kinds, and it is applicable broadly to the formation of products of this character which have either plain or figured surfaces, and which are produced either by the ordinary one step rolling process, or by the two step rolling-pressing method disclosed in applicant's earlier Patents Nos. 661,025, 827,484, 844,485, 952,390, etc., or by the three step rolling-heating-pressing procedure disclosed in my copending application Ser. No. 802,311, of which this application is in part a continuation. The objects of my present invention, generally stated, are to avoid various difficulties due to the thermal expansion and distortion of the table surfaces upon which the glass sheets are formed, to improve the quality of the product by providing more favorable conditions both for its initial formation and for its subsequent annealing, and to greatly facilitate and expedite the speed of operation—i. e., to greatly increase the number of sheets produced per hour by one gang of men—and to thus correspondingly reduce the cost of manufacture. Other more specific objects and advantages of my invention will be apparent to those skilled in the art, from the detail description which follows, in which various illustrative embodiments of my improvements—which relate in part to a process or mode of procedure and in part to means and instrumentalities for carrying out that process—are fully explained.

In order to facilitate an understanding of the salient features of the hereinafter described method for the manufacture of sheet or plate glass products I will first briefly refer to the manner in which these products have heretofore been made either by rolling alone or by first rolling and then pressing. In these operations a mass of unformed molten material—varying in amount from a few hundred to several thousand pounds, according to the size and thickness of plate to be produced—is first "teemed" or poured on one end of an iron rolling table; and is then spread out to sheet form thereon by the action of a roller. The mass of unformed glass is deposited on the table, at a relatively high temperature—usually approximating 1800 degrees Fahr.—and the upper surface of the metal support is intensely heated by contact with this great mass of very hot material; the heating being greatest, of course, at the end where the molten mass is "teemed," and least at the end where the spreading of the sheet is completed. This intense heating of the upper surface of the metal rolling table rapidly expands that side of the table—as an appreciable time is required for the heat to distribute and equalize itself throughout the mass of relatively cold iron comprising the support—and as a result of this rapid localized heating the table "bows up" or assumes an assymmetrical convex form, the curvature of which is greatest at the end where the glass is first deposited. This "bowing" of the table introduces particular difficulties when the rolled sheet of glass is to be subjected to a subsequent pressing operation; and in such cases some special provision must be made to overcome these difficulties—such, for example, as the procedure and means disclosed in my former Patent No. 952,390, or such as described in my copending application Ser. No. 802,311. But in all cases this "bowing" of the table is objectionable and disadvantageous because it necessarily involves a stretching of the upper layers of metal, with a consequent opening of the "pores" of the iron, which allows the escape of gases and results in the formation of a rough "pitted" or clouded table surface on the under side of the glass sheet. At times this "bowing" action becomes so pronounced as to open up cracks or "checks" in the table support—particularly when the metal from which it is made is not very homogeneous or uniform in texture—and this "checking" of the iron will in time necessitate either the resurfacing of the entire table or its rejection and replacement. This difficulty is a particularly serious one in the manufacture of ornamental or patterned sheets of glass—such, for example, as rolled sheet prism glass—which is produced by the use of a reversely figured rolling table.

The assymmetrical swelling up or crowning of the supporting surface causes the glass sheet, which has been rolled out thereon, to assume a correspondingly bent or bowed form. This sheet must be allowed to remain on the table sufficiently long to impart to it a partial "set," which will permit it to be shoved or pushed off from the table, either endwise or sidewise, into an annealing lehr or oven. As it is always desirable to produce sheets which are as flat and smooth as possible the oven floors of these annealing chambers or lehrs are carefully leveled. If the sheet is bent or warped when it leaves the rolling table it will not, at first, rest evenly on the flat floors of the annealing chambers; and in the movement of the sheet over the floor surfaces the contacting portions of the sheet and the floor are both subjected to local abrasion and wear. If the sheets are badly bent and "set" in their bent form—as is frequently the case in producing rolled-pressed products of considerable thickness (such as heavy skylight prism)—a considerably longer time is also required to properly straighten and anneal them in the lehr chambers, than is necessary with initially flat plates.

For all of the above reasons it is essential to reduce the "bowing" or "crowning" of the rolling table surface to a minimum. In the commercial manufacture of sheets in the manner above described, this action is cumulative in effect; and the only way in which it can be kept within bounds is to allow a considerable interval to elapse between the removal of one sheet from the table and the rolling of another thereon—thereby allowing a partial equalization or distribution of the heat, locally imparted to the upper surface, throughout the mass of the table and its support. But the time that can be allowed for this equalizing action is limited—when only one table is used—by commercial considerations of economy, and by the fact that the surface temperature of the rolling table must not be allowed to vary by too great a range; if it is too hot the glass will stick to it, and if it is too cold the glass will be cracked or crazed on its lower side. In some cases the natural cooling of the heated table surface, in the intervals between the rolling operations, is accelerated, externally by blasts of cold air, or internally by water cooling. But any artificial chilling of the metal in this manner has been found objectionable in that it accentuates rapid changes in temperature between different portions of the table and therefore aggravates, rather than reduces, the assymmetrical distortion, and the superficial stretching and checking of the rolling surface.

The possible speed of manufacture of the sheets may be considerably increased—i. e., the intervals between the spreading of successive sheets on the rolling table may be reduced—by the use of water cooled tables; but aside from the disadvantages already mentioned such tables are only effective in accelerating production to a limited degree, because in the system of procedure heretofore employed in this line of manufacture all of the sheets produced on a single rolling table are shoved in succession into one lehr, or one system of lehr chambers; and it is necessary to leave each sheet a certain minimum length of time in each lehr station—in order to secure the necessary and essential annealing action—before it can be advanced or shoved on to the next station. This minimum interval of "rest" in the annealing ovens determines the maximum speed of operation in the successive rolling of the sheets; and this minimum "wait" period is several times the period required for the rolling or spreading operation itself. The men of the rolling gang are therefore in some cases idle or unoccupied for more than 80% of their time.

In the improved mode of procedure employed by me the difficulties and delays heretofore encountered in sheet manufacture are largely avoided, or completely eliminated, by using a twin or "Janus" faced rolling table—which is mounted so that it can be readily reversed or inverted between successive rolling operations—and by alternately spreading the sheets of molten glass in opposite directions and on the opposite sides of the reversible table; so that the two faces and the two ends thereof are exposed in reciprocating order to the heating and distorting effects of the hot unformed masses of glass and of the sheets or plates formed therefrom. The result of this mode of procedure is that, as the upper face of the table is expanded and stretched and "bowed" upward by the heat of one sheet forming operation, the lower or opposite face is bowed or bent in the reverse direction—with a consequent slight condensation or compression of the metal on this side—and when the table is reversed for the next operation this "concaved" relatively cool and condensed metal face is brought uppermost to receive the next charge of glass, which is "teemed" or poured on the end opposite that which received the preceding charge, and is rolled or spread in the reverse direction. This alternate heating of opposite sides of the rolling table—with the greatest heat applied in reciprocating order to opposite ends of the said table—results in the maintenance of substantial uniformity in the average temperature conditions at different parts of the rolling table and its associated parts, and in the consequent elimination, in large part, of the effects of assymmetrical thermal distortion of the rolling surfaces. But there is a further very marked advantage in this reciprocating-reversed order of successively depositing and spreading the molten glass masses alternately on opposite ends and opposite sides of a single rolling table; and that is the possibility of effectively water cooling the interior or center portion of the said table—thereby increasing the rate of cooling of both rolling surfaces—without accentuating, but on the contrary, reducing the differences of temperature between the opposing and alternately uppermost faces thereof. This permits of the formation of successive sheets in more rapid alternation and correspondingly increases the output of each table and rolling gang.

In order to avail myself fully of the gain in speed thus effected in the rolling operations—and avoid the "wait" necessary for the "rest" period in the subsequent annealing of each sheet—I also provide for the transfer of successive sheets in regular sequence or order to a plurality (two or more) of lehrs, which may be arranged in such combined relation to the reversible rolling table that each lehr receives an additional sheet at regular time intervals—which are longer than the intervals between the rolling operations in the ratio of the number of lehrs in the system—or which may also be so arranged that one of the said lehrs receives sheets at considerably longer or shorter intervals than the other lehr or lehrs; this last arrangement and order of procedure being utilized when it is desired to produce successive sheets of different thickness, or different surface configuration, which require different "rest" periods in the annealing operations. This last possibility is an important advantage in producing limited amounts of pressed plate products in conjunction with larger quantities of ordinary rolled sheet products; and it constitutes an important subsidiary advantage of my present improvements.

Another feature of my reversible-table-multiple lehr system is the arrangement of the sheet forming and annealing instrumentalities in such manner that each sheet can be moved from the table into the lehr in the reverse direction to that in which it is rolled out on the table, so that the end of the plate which is first formed from the plastic mass of glass—which is known in shop parlance as the "cold end" or the "black end"—is at the back or hottest portion of the oven chambers, where it will receive the most heat and will be most effectively softened and annealed in its passage to the lehr rods. This arrangement is particularly effective and advantageous in the utilization of a plurality of lehrs to receive the product from my bifacial-bidirectional rolling apparatus, because it supplements and carries forward the favorable conditions for temperature equalization that are inaugurated in the rolling operation itself, by the maintenance of equitable temperature conditions in the rolling table surfaces.

With this preliminary statement of the general process features of my present invention in mind the detail operative characteristics of the various forms of apparatus, hereinafter described as illustrative embodiments of the structural features of my improvements, will be readily understood without any extended description. As a further guide to those skilled in the art it may be stated that the main forms of apparatus shown in the various accompanying figures are working designs, although many details of actual construction (which can be readily supplied by any ceramic engineer) have been omitted from the relatively small scale illustrations merely for the sake of avoiding unnecessary complexity and bringing out more clearly the essential mechanical features of the working parts.

In the drawings Fig. 1 is a general semi-diagrammatic plan view of one illustrative arrangement of a reversible table, bidirectional rolling apparatus and multiple lehr system; Fig. 2 is a detail side view (on a larger scale) of the center and one end of the rolling mechanism shown in Fig. 1; Fig. 3 is a plan view, and Fig. 4 is an end view, partly in section, of this same mechanism; Figs. 5 and 6 are cross sectional detail views (in elevation) of the rolling table itself; Fig. 7 is a semi-diagrammatic side view (partly in section) of the apparatus shown in Fig. 1, as adapted to the production of wire glass; Fig. 8 is a diagrammatic plan view of another form of reversible-table-multiple-lehr system which embodies the broad features of my invention; Fig. 9 is a semi-diagrammatic side view (on an enlarged scale) of the sheet forming mechanism of this second form of apparatus; Fig. 10 is a plan view of another apparatus which is designed and adapted for the production of pressed plate products—or for the joint and concurrent production of both plain rolled and rolled-pressed products—in accordance with my improved mode of procedure; Figs. 11 and 12 are respectively side and end elevations of the mechanism shown in plan view in Fig. 10; Fig. 13 is an end view of one portion of this mechanism; Fig. 14 is a cross sectional elevation (on an enlarged scale) of the central portion of the apparatus illustrated in Figs. 10 to 13; Fig. 15 is an end view (partly in section and partly in elevation) of a part of the mechanism shown in Fig. 14; and Fig. 16 is a detailed sectional view of another part of this same mechanism.

Fig. 17 is a semi-diagrammatic plan view of still another apparatus which presents a combination of structural and operative features that constitute a conjoint embodiment of my present improvements and the invention of my hereinbefore mentioned application Ser. No. 802,311, filed Nov. 21st, 1913; Fig. 18 is a semi-diagrammatic elevation (in part section) of this same apparatus; Fig. 19 is an enlarged detail sectional elevation of a portion of the rolling table mechanism shown diagrammatically in Figs. 17 and 18; Figs. 20 and 21 are diagrammatic plan views of two more arrangements of rolling-heating-pressing instrumentalities in combination with a reversible-table-multiple-lehr-system, and constituting, as a whole, further illustrative conjoint embodiments of the two inventions above referred to; and Figs. 22, 23 and 24 are enlarged detail views of a portion of the table mechanism that may be used in the apparatus shown in Figs. 20 and 21.

In all of these illustrations the same letters and numerals are used, as far as possible, to designate and indicate the same, or corresponding, parts and elements of the various structural embodiments of my invention.

Referring first to the apparatus shown in Figs. 1 to 6: This apparatus is designed particularly to produce rolled sheet products—either plain or figured or wire "skylight" glass—of an approximate size of 42 by 132 inches or less. In these figures, A, designates the glass furnace or receptacle containing the supply of unformed molten material; and B designates the system of tracks leading from this source of supply to the sheet forming mechanism C. This sheet forming mechanism is positioned symmetrically between two multiple lehr systems F and G; each of which comprises the sheet receiving chamber $a$, the series of connected annealing chambers or ovens $b$—$c$—$d$—$e$, and $b'$—$c'$—$d'$—$e'$, and the usual double rod Tondeur lehr tunnels $f$ and $f'$.

The sheet forming mechanism C comprises a spreading roll 1 adjustably mounted in vertical housings 2, 2, at the center of the machine and a twin faced rolling table 3 rotatably mounted, on end trunnions, 4, 4, in a traveling cradle frame 5, that is movable longitudinally—under the spreading roll 1— to either the full line position D, or the dotted line position E, of Fig. 1. The table 3 is provided with a series of longitudinal passage ways, 6, 6, 6, through which an intermittent circulation of water is maintained by means of the pipe and valve system illustrated in detail in Fig. 5—which will be more fully described hereafter—the arrangement being such that when the table is in position D the water flows through the passages, 6, 6, 6, from left to right, (i. e., enters at the left hand end and leaves at the right hand end of the table 3), and when the table is in position E the direction of circulation is reversed, i. e., from right to left.

In the operation of this apparatus the table is moved, say from the full line position D, until its right hand end is just under the spreading roll 1. A charge of glass, just sufficient in amount to make one sheet, is then taken from the furnace or source of supply A—which may be either a continuous tank or an individual pot melting furnace—transferred to the sheet forming mechanism C by means of the track system B, and "teemed" or poured on the right hand end of the table 3 just in front, or to the left, of the spreading roll 1. The table is then moved to the right under the roll— the latter being simultaneously revolved in a counter-clockwise direction at a peripheral speed just equal to the linear movement of the table—by any suitable mechanism (alternative forms of which are later described more in detail) and the unformed mass of plastic glass is spread out into sheet form. The movement of the table is continued until it reaches the position E, at which time a current of water is automatically established through the passage ways 6, 6, etc., from right to left. The freshly rolled sheet is left in position on the table for a short interval—to give it a slight partial "set" that will permit it to be moved endwise as a whole—and is then "shoved" into the receiving chamber, $a$, of the right hand lehr system G. The first formed or "cold" portion of this sheet is obviously at the right hand end of the table—which received the mass of unformed molten material—and this portion will enter the lehr chamber first and will rest at the rear or hotter end of the said chamber. The heat communicated to the rolling table from the glass, in the "teeming" and spreading operations, will expand the upper face of that table and cause it to bow or bend upward so as to present a convex upper surface and a correspondingly concave lower surface. This expansion and "bowing" will be greatest at the right hand end which receives the entire mass of unformed molten material and which absorbs the greatest amount of heat both from this mass as a whole and from the sheet subsequently formed therefrom. When the current of water is established through the table from right to left the hotter portions of the metal are first subjected to the influence of the entering fluid, and are obviously cooled most rapidly by this action, which tends therefore to equalize the temperature longitudinally of the table, and produce a more symmetrical convexity of its upper surface.

After the sheet of glass has been transferred from the table to the chamber, $a$, of the lehr system G, the table 3 is reversed or turned over on its trunnion supports, 4, 4, so as to bring the cooler concaved surface uppermost, and the hotter convex surface underneath. After this reversal the further cooling of the latter surface will, of course, proceed less rapidly than before because the cooling of that surface by convection currents will be largely eliminated. The time of table reversal will be determined and controlled to some extent by the cooling conditions—such as the temperature and volume of the circulating water, the temperature of the surrounding air, the radiation factors, etc. etc.—and can in general be so chosen that when the time arrives for the formation of the next sheet the upper rolling surface will still be slightly concaved. The table is then moved to the left until its advancing end is just under the spreading roll; a new charge of molten glass is "teemed" on that end of the table, just to the right of the roll; and this mass is rolled out into sheet form as before by the subsequent movement of the table (and simultaneous clockwise revolution of the roll 1) to the right into position D; in which position a current of water is automatically established through the passages 6, 6, etc. from left to right. The sheet thus formed is next shoved into the receiving chamber, $a$, of the lehr system F; the "cold" end of this sheet, being, as before, pushed to the back end of this chamber. The heating of the upper side of the table in the last described operation raises the temperature of the top surface above that of the continually cooling lower face, and "bows" the table in the reverse direction so that the initially cooler and slightly concave upper surface now becomes slightly convex—the greater convexity being now at the left hand end of the table—and the previously used slightly convex side becomes slightly concave. The table is then reversed again, and is ready for a repetition of the first described operation of rolling out a sheet from right to left. In the interim the sheet previously pushed into the first chamber, $a$, of the lehr system G is moved laterally into either the chamber $b$ or the chamber $b'$ of this system, leaving the receiving oven ready for the reception of the next formed plate.

As the sheet rolling operations proceed in the order described—the unformed molten masses being rolled out alternately in opposite directions and on opposite sides of the table 3, and then pushed in reciprocating order into the receiving chambers of the multiple lehr systems G and F (with the "cold end" of each sheet always in advance)—the sheets previously formed and delivered to the first ovens or stations, $a(G)$, and, $a(F)$, are pushed successively into and through the succeeding lehr chambers in the order $b(G)$, $b(F)$, $b'(G)$, $b'(F)$, $c(G)$, etc., (or vice versa as may be desired); so that each sheet rests in each receiving chamber, $a$, for approximately twice the interval between successive rolling operations, and rests in each succeeding lehr oven $b$, $c$, $d$, etc., for approximately four times this interval. Or put in the reverse way the rolling operations may, in my improved mode of procedure, be carried on with approximately four times the rapidity heretofore possible and permissible with the usual arrangement of rolling table and lehr; and the rolling "gang" may be kept continually occupied instead of being kept in enforced idleness for something like 80% of the working time. In addition to this very great reduction in the cost of manufacture—due to the greatly multiplied output of each rolling mechanism and each group of operators therefor—the practise of my invention has other very marked advantages, in reducing the physical strain and wear on the rolling table faces and other cooperating parts of the spreading mechanism (by symmetrizing the heating and cooling of different portions thereof in the manner previously described) thus maintaining these faces much more nearly flat and in much better surface condition than is possible when all the sheets are rolled out in the same direction and on the same side of the table; and in correspondingly reducing the initial warping and thermal distortion, and improving the surface character and physical uniformity of the final annealed product. These last advantages are, as already indicated, particularly important ones in the manufacture of ornamental or figured glass that may be produced either by the use of figured surfaces, on the rolling table 3, (in the forms of apparatus shown in Figs. 1–9) or by the use of a pressing die subsequently applied to the rolled out plates (see Figs. 10–16).

Taking up now a more detailed description of the structural features of the rolling mechanism shown in Figs. 2–6, I first call attention to the construction of the rolling table 3. In the manufacture of ordinary rough rolled plate—which is used either in its rough state for skylight purposes, or is subsequently ground and polished to form either semi-plate or full plate glass—the smoothness, or rather clearness or transparency, of the table side of the glass is not of prime importance—and in such cases the table 1 may be made in one piece (with the water passages 6, 6, 6, cored out)—the plate being preferably cast on edge so that the metal on the two sides will be substantially the same in homogeneity and uniformity of grain. But where it is desired to produce rolled sheet glass the table surfaces of which shall be of the highest quality, it is necessary to make the rolling faces of the table of very fine close grained metal that can be highly polished—preferably from the so called "soft chill" iron that is in common use by the manufacturers of glass molds. This iron can only be "chilled" on one side of the casting, and in order to produce a rolling table with two "chilled" metal sides (and for other structural reasons) I prefer to make this part of my improved rolling mechanism from two plates which are planed and finished on both sides and edges and are then clamped rigidly together, to form a substantially integral piece, by means of the recessed cap-bolts, 7, 7, etc., and the rabbeted edge and end strips 8—8, 9—9, that are secured in place by the screws 10—10, etc., 11—11, etc. In order to obtain a very intimate physical union between the parts, the engaging edges of the rabbets and tongues, on the strips 8—9 and the table 3, are slightly beveled; and the strips, as well as the securing bolts 7—10—11, are heated before being put in place;—the subsequent contraction of the screws acting to bind the assembled portions of the table into one piece that will expand and contract and bend or bow like an integral solid piece of metal. The heads of the screws, 7, 7, are then covered by plugs of "chilled" metal—driven in cold when the table is hot—and the surface containing these plugs is finished and polished to form one of the two twin rolling surfaces.

The end strips 9—9 are each provided with a trunnion projection 4, on which the table is reversibly supported in the cradle frame 5. These trunnions are bored axially to receive the water circulation pipe 12 which passes loosely through an opening in the center of the table 3 and extends the entire length of the machine (as shown in Fig. 1), being supported at each end by a set of inlet and discharge pipe connections 13, 14 (only one of which is shown, at the left hand end, in Figs. 2, 3, and 5). This circulation pipe is closed at the center by a plug 15 (Fig. 5), and is provided at each end with a short section of smaller pipe 16, which is connected at its outer end with the discharge pipe 14, and carries at its inner end a ring or collar 17, that serves to form the end wall of an annular chamber 18 between the pipes 12 and 16. This annular chamber communicates with the inlet pipe 13 through an ordinary T connection 19, and is provided at its inner end with a port 20. The inlet pipe 13 is furnished with a valve 22 which is normally closed by a spring 23, and is opened by the engagement of the trunnion end with a slide 24 that is connected by a link 25 with the actuating arm of the valve 22.

Each end of the table 3 is provided with a transverse recess 21, which is covered by the end plate 9, and which communicates with the parallel longitudinal passages 6, 6, 6 etc. When the table is moved to either of its end positions D or E the valve 22, at that end, is opened by the engagement of the trunnion 4 with the slide 24; and as soon as the port 20 is brought into registry with any part of the recess 21, water flows through the annular chamber 18 and the port and recess, into and through the longitudinal passage ways 6, 6, etc. to the recess 21 at the opposite end of the table—the end nearest the center of the machine—and thence through the other end port 20′ into the pipe 12, from which it is discharged through the pipe 16 into the outlet connection 14. In both positions water flows into the table at the outer and hotter end—which is the end on which the glass of the last formed sheet was "teemed"—and is discharged from the table into the pipe 12 at the inner and cooler end where the formation of that sheet was completed. As soon as the table is moved from either of its end positions towards the other —in the formation of the next sheet—the flow of water through the table is shut off by the movement of the ports 20 and 20′ out of registry with the recesses 21, 21; and the valve 22 is then closed, by the disengagement of the collar 24 and the action of the spring 23, so as to prevent any escape of water from the exposed port opening 20. In the longitudinal movement of the table from one position of rest to the other, the end recesses 21 thereof will be momentarily in communication with the exit ports 20′ at two points of the travel—one near the beginning and one near the end of the table movement—before the inlet port 20 registers with the outermost of said recesses; and these intermediate momentary communications of the water passages in the table with the outlet or exhaust pipe openings, affords an opportunity for the relief of any pressure that may be generated in the said passages by the heating of the water therein during the teeming and rolling steps of the operation.

The cradle frame 5, which carries the reversible rolling table, can also be cast in one piece, but for convenience of machining it is preferably constructed of two side bars 26 united at the ends by cross frames 27 which support the table trunnions 4, 4. The upper edges of these side bars are provided with rack teeth which are engaged by the pinions 28, 28, that are carried on shafts rotatably mounted in boxes secured to the vertical housings 2—2 of the machine, and are rotated synchronously by the spur gears 30 —31, 30—31 and the power driven shaft 32. The cradle frame 5 is supported for longitudinal movement—under the driving action of the rack and spur gear connections—on the series of track wheels 29, 29 etc. which are preferably mounted for independent adjustment (for the purpose of accurate alignment) in a corresponding series of hollow box frames 33, 33 etc. that are bolted to the longitudinal channel box girders 34, 34; and these girders are framed together at the center and ends, by the cross beams 35—35 and the housing support 36, to form the main base of the rolling machine frame.

The spreading roll 1 is rotatably mounted on the cross shaft 37, which is provided at each end with an eccentric portion 38 that is supported in an L shaped block 39, which can slide vertically in a slot 40 at the upper end of the housing standard 2. The lower legs of these blocks are slotted at their ends to slideably engage the ribs 41, 41 on the edges of the rolling table 3 (as best shown in section at the left hand of Fig. 4 where the table is in an intermediate position under the spreading roll); and the blocks and spreading roll are elastically suspended on rods and springs 42—43 which are so adjusted as to carry the maximum portion of the weight of these suspended parts, and prevent their downward movement when the table ribs 41, 41 are not in engagement with the slotted blocks 39, 39. One of the projecting ends of the eccentric gudgeons 38 carries a slotted hub plate 44, which is provided with a lever or handle 45, and a clamp screw 46, by means of which the roll shaft 37 can be rotated to, and clamped in, any desired position; thereby varying the vertical setting of the roll 1 with respect to the L frames 39 and the rolling table 3. The spreading roll itself is rotated on the roll shaft 37 by means of chain gearing, which consist of sprocket wheels 47 secured to the ends of the roll 1, sprocket pinions 48 secured to the rack driving pinions 28, and sprocket chains 49, which connect the said wheels; the ratio of the sprocket wheels and pinions being such that the roll 1 is revolved at a peripheral speed equal to the linear movement of the table 3. Take up pinions 50, 50, laterally movable on the housing standards 2, 2, are provided for the purpose of adjusting the tension of the chains when the roll is raised or lowered in the manner above described.

The purpose of providing the sliding connections between the roll frames 39 and the table ribs 41 is to maintain a uniform spacing between the roll 1 and the table 3 during the sheet forming operations, regardless of any longitudinal curvature of the table, or any other vertical movements of either edge thereof; and to also provide means for the operative maintenance of any desired vertical relationship between these parts so as to produce sheets of glass of any predetermined thickness. This thickness can be readily varied—between each successive rolling operation if desired—by a movement of the handle 45.

In order to facilitate the reversal of the rolling table 3 the end trunnion supports 27 may be provided with ball bearing anti-friction rolls 51 (see Fig. 5); and some simple and easily operated means—such as the sliding pins 52, 52 (see Fig. 2)—is also provided to prevent such reversal or accidental rotation at the times when the ribs 41 are not in engagement with the blocks 39. I also provide a pair of triangular "guns" 53—which may be placed in either the full line or the dotted line position shown in Fig. 2 and supported in that position by any suitable means (such as the hooks 54 or 55)—between which the glass is "teemed" on the table in front of the spreading roll. These "guns" are of the usual well known form, and in order to avoid unnecessary complexity of the relatively small scale illustrations they are not shown in either Figs. 3 or 4. The prime mover which drives the shaft 31, as well as various other minor details of construction (necessary for the convenient commercial operation of the apparatus, but forming no part of my present improvements) are likewise omitted on the drawings as they can be readily supplied by any skilled engineer.

The rolling mechanism above described is suitable for the production of rolled sheets of any desired thickness and having either plain or figured surfaces on one or both surfaces; and it is furthermore of such construction that either the table or the spreading roll, or both, may be very readily removed and replaced by others (in changing from ornamental or prism glass manufacture to plain skylight glass, or vice versa); and it is also obvious that the twin faced rolling table may be provided with one flat rolling surface and one figured rolling surface so as to produce both forms of sheet product concurrently.

The above described form of sheet forming apparatus can also be utilized in the production of wire glass by the two sheet or "sandwich" method by adding to the mechanism shown in Figs. 1 to 6 the wire carrying rolls and chutes 56 and 57 shown in Fig. 7. In the manufacture of this last mentioned product the table is started say from position E and the lower sheet is rolled out by moving it to the left under the spreading roll 1. The wire mesh is then drawn down the chute 56 until its end rests on the glass; a new ladle of molten material is "teemed" on the end of the first formed sheet and rolled out on top of the latter—and the interposed wire mesh—by the reversed movement of the table to the right, back to position E. In the interval between the rolling of the lower and upper sheets the roll 1 is, of course, raised by the lever 45 to the height necessary to form the second layer on top of the first; and in this procedure it is desirable to provide some simple form of stop and lock mechanism which will arrest and hold the eccentric gudgeon shifting device at the two points required for the proper rolling of the two layers that together form the completed sheet of wire glass. The chute 56 is next raised and the table is preferably returned to position D from which the now partially chilled and set plate is shoved into the receiving chamber of the left hand lehr system F, with the first formed end of the lower layer—which is obviously the coldest part of the completed sheet—in advance, or toward the inner and hotter part of the annealing chambers. The table is then reversed—while it is being cooled as before described by a reversed water circulation—the spreading roll is lowered to its first setting, and the chute 57 is dropped to its delivery position; and then, after the proper interval, the next double layer sheet rolling operation is carried out—each layer of this sheet being spread in the reverse direction to that in which the corresponding layer of the preceding sheet was spread—and the completed plate is shoved into the receiving chamber of the right hand lehr system G.

It will be clear that the last described mode of procedure in the manufacture of two layer wire glass—or any other multiple sheet glass product—by the use of the apparatus shown in Figs. 2 to 7, presents substantially the same advantages as are generally characteristic of my improvements as applied to the production of single layer sheet or plate glass.

Figs. 8 and 9 show another form of apparatus adapted to the practise of my invention. In this arrangement of instrumentalities I make use of a longitudinally fixed reversible rolling table 3ª, which is mounted directly on stationary trunnion supports 27ª, 27ª at the ends of the machine frame 34ª; and of a longitudinally movable roll 1ª, that can be drawn over the table—alternately in opposite directions—by means of endless cables, 60, 60, the ends of which are secured to draft eyes 61, 61, rotatably mounted on the ends of the roll shaft, and the centers of which are wrapped around the driving drums 62, 62, that are driven synchronously by any suitable motor under the control of the machine operator.

Each of the trunnion supporting standards of the machine frame 34ª is provided with a pair of roll guides 63, 63, which are so formed and arranged as to engage loose collars or rollers rotatably mounted on the projecting ends of the roll shaft (between the ends of the roll 1ª and the draft eyes 61, 61) and lift the said roll 1ª above the level of the rolled out sheet as it passes beyond either end of the rolling table 3ª. These end standards also carry tight-and-loose cable control devices—such as the swinging lever sheave supports, 64, 64,—which may be readily and conveniently manipulated so as to slack away and drop the upper portions of the cables 60, 60, below the level of the rolling surface (as indicated in full lines in Fig. 9) or so as to lift and tighten these cables (as indicates in dotted lines in that figure) when the spreading roll is to be moved in either direction.

The table 3ª is of the same general construction as the one used in the previously described form of apparatus and is supplied with cooling water through pipes 65, 66, that lead from the end trunnions to a four-way valve 67 located near the driving drum 62 and adapted to be automatically operated by a gear 68 which is connected to the drum 62 in such manner as to reverse the valve at the completion of each longitudinal movement of the spreading roll 1ª.

The sheet forming mechanism as a whole is positioned as before between two lehrs F' and G', which consist in this case of only one set of chambers, a, b, c, d, e, communicating at the end with the rod delivery chamber f. The ladle, or pot, track system B' is arranged to permit of the "teeming" of the glass at either end of the stationary rolling table—a single pair of triangular reversible "guns" 69 being provided for confining the glass laterally during the "teeming" and rolling operations. The thickness of the sheets produced by this apparatus is determined either by "trangs" 70, 70, secured to the two sides of the table 3ª, or by roll collars carried by the ends of the spreading roll 1ª; and the roll is rotated as it moves along the table either by the frictional contact between its surface and the "trangs," or by the engagement of the toothed collars with rack teeth on the edges to the table. These last mentioned alternative details of construction are all well known, and in common use, and are not therefore specifically illustrated.

The operation of the apparatus last described is as follows: Starting with the roll 1ª at the left hand end of the table—with all the parts in the full line position of Figs. 8 and 9—the drums 62 are first rotated counterclockwise to lower the spreading roll onto the left hand end of the table 3ª; and the "guns" 70 are placed in position in front of the roll (as shown in dotted lines at the left of Fig. 9). A charge of molten glass is then teemed on the table (between the "guns" and in front of the roll), and the right hand sheave levers 64 are thrown up to the dotted line position, to raise and tighten the upper right hand portions of the cables 60. The roll 1ª is then drawn forward over the table surface by the counterclockwise rotation of the drums 62—thus spreading out the unformed mass of glass into a sheet of the predetermined thickness—until it reaches the right hand end of the machine frame where it is again lifted from the table by the engagement of the collars at the ends of the roll shaft with the right hand guides 63. At the end of this movement the gear 68 engages with the handle of the four-way valve 67 and moves the said valve in such direction as to admit water to the left hand end of the table—through the pipe 65—and allow it to escape from the right hand end thereof (through the pipe 66). The sheet, after having become sufficiently set, is then shoved into the left hand lehr F' with the "cold" end foremost. The table 3ª is next reversed on its trunnion supports and the left hand sheave levers 64 are thrown down to lower the cables 60 below the table surface and thus prevent them from interfering with the next glass "teeming" operation. The parts are now in position for a repetition of the previously described sequence of steps, with a reversed order of movement of the spreading roll from right to left,—with a terminal reversal of the four-way valve 67 to admit water through the pipe 66 and discharge it from the pipe 65—and with a subsequent delivery of the next formed sheet to the right hand lehr G'.

Figs. 10 to 16 inclusive illustrate a form of apparatus adapted to produce pressed plate products—of an approximate size of 72 by 96 inches or less—by my improved sheet forming process. In these figures 3ᵇ indicates the rolling table which is similar to the table shown in Figs. 5 and 6 in that it comprises two plate sections secured together by the side and end strips 8ᵇ, 9ᵇ, and the bolts 7ᵇ, 10ᵇ, 11ᵇ (see Figs. 14 and 15) and is provided with longitudinal and transverse water ducts 6ᵇ, 21ᵇ, which communicate with inlet and outlet passages in the hollow trunnions 4ᵇ, 4ᵇ, on the end strips 9ᵇ. The edges of the side strips 8ᵇ are provided with rack teeth which are engaged, in the different longitudinal positions of the table, by one (or two) of the three pairs of pinions 28ª 28ᵇ and 28ᶜ, that are driven synchronously by the attached worm wheels 30ª, 30ᵇ, 30ᶜ, and the interconnected system of worms and worm shafts 31ᵇ—31ᵇ and bevel gears and cross shaft 32ᵇ;—the driving gear system as a whole being actuated by a reversible variable speed motor 72, and controlled by suitable rheostat and switch mechanism (not shown). The table 3ᵇ rests directly on a series of track wheels 29ᵇ, 29ᵇ, etc., (six of which are secured to, and revolve with, the pinions and worm gears 28ª—30ª, 28ᵇ—30ᵇ and 28ᶜ—30ᶜ, and the remainder of which act independently) rotatably mounted in the hollow box frames 33ᵇ 33ᵇ, etc., that are separately supported (for independent adjustment) on the longitudinal channel box girders 34ᵇ; and these side girders are framed together, at their ends and at intermediate points in their length, by the four sets of cross girders 35ᵇ, 35ᵇ, etc., (shown in Figs. 10, 11, 13 and 14), and the housing supports and cross beams 36ᵇ, etc., (best shown in Figs. 11 and 14) to form a rigid and unitary base for the entire rolling-pressing mechanism.

The machine frame is provided at its center with two symmetrically disposed housing standards 2ᵇ 2ᵇ, which serve to support both the spreading rolls 1ᵇ and 1ᶜ, and the pressing die 73, which is used to refigure or resurface the upper face of the glass sheet after it has been rolled out on the table 3ᵇ. The spreading rolls 1ᵇ and 1ᶜ are each rotatably mounted on a shaft 37ᵇ, which is secured at its ends to the extremities of the levers 74, 74, that are pivotally mounted at their central points on the housing standards 2ᵇ. The ends of these levers 74 are provided with cross guides that carry adjustable plates 39ᵇ, 39ᶜ, (shown in Figs. 11, 14 and 15, but omitted in Figs. 10 and 12) which are slotted at their lower ends to engage with the ribs 41ᵇ, 41ᵇ, on the edges of the table (as best shown at the right of Fig. 15). These plates 39ᵇ, 39ᶜ, also carry stud bolts 75, 76, which serve the joint purpose of clamping the plates in the cross guides and of rotatably supporting the single spur pinions 77 and the double spur pinions 77ª. The larger of the two gear elements of these double pinions engage the pinions 77, and the smaller gear elements thereof engage the spur gears 47ᵇ 47ᶜ (see best Figs. 14 and 15) which are secured to the ends of the rolls 1ᵇ and 1ᶜ. When either of these rolls is lowered into operative position (in which the slotted ends of the plates 39ᵇ or 39ᶜ engage the side ribs 41ᵇ) the spur gears 77 are engaged by the rack teeth on the upper edges of the side bars, 8ᵇ, and rotate the roll at a peripheral speed just equal to the linear movement of the table surface.

The press die 73 is suspended from the structural steel frame 78 by means of six hangers 79, 79 etc. which engage at their lower ends with pins 80, 80, etc., that are threaded into the ends of the die plate 73, and which are secured at their upper ends to the pistons 81, 81, etc., in the pneumatic cylinders 82, 82, etc., that are bolted to the ends of the frame 78. This frame is in turn pivotally suspended on the heavy cross shaft 83 that is carried by the housing standards 2ᵇ, 2ᵇ. The cylinders 82 are all similar in construction, but the four at the corners of the frame 78 are of larger diameter (see cross section of Fig. 16) than the intermediate ones (see cross section at the right of Fig. 14); and these four larger cylinders are interconnected by the system of equalizing conduits 84, 84, etc. Each cylinder is also provided with an entry port 85 which is so positioned as to be slightly open when the pistons 81 are in their lowermost position, and to be partially opened, into the space below the said pistons, when the latter are raised to the top of the cylinder. These ports are all connected to the system of air supply pipes 86, 86, etc., which is in turn connected to the air conduit 87 that leads to a main service pipe 88. Springs 89 are preferably interposed between the pistons and the tops of the cylinders, but these springs are not necessary and may be omitted. I also prefer to provide two additional cylinders 90, 90, which are secured to the frame 78 just underneath the cross shafts 83, and which carry spring pressed pistons similar to those shown in section at the right of Fig. 14, but which are not connected to the air supply system 86—87—88. The ends of the piston rods of these cylinders bear on the back of the die 73 but are not pivotally connected thereto (see Fig. 14).

In order to make use of the pressing die 73—in refiguring the rolled glass plate—I preferably employ the cylinder-lever-system shown in Fig. 14 for lifting the table from its supporting track wheels (after it has been brought to the center of the machine) and pressing the glass sheet supported thereon against the lower face of the die. This cylinder-lever-table lifting mechanism is the same, in all essential respects, as the corresponding portion of the apparatus illustrated and described in my earlier Patent No. 789,397 and need not therefore be again explained in detail here. The single acting cylinder 91, which actuates the table lifting system, is supplied with air through the pipe 92, that is connected to the main service pipe 88; and the admission and discharge of compressed fluid, to and from the cylinder 91 is controlled by a three-way valve 93 in the pipe 92.

In order to provide for the reversal of the rolling table $3^b$ the machine frame is provided at one or both ends with a pair of vertically movable standards 94 that slide in frames 95 and can be raised and lowered together by the screws 96 and the connecting worm and worm wheel gearing 97—98 which is actuated by the motor 99. By the action of this lifting mechanism the table can be raised enough above the supporting track wheels $29^b$ to permit of its reversal (see Fig 13).

The lifting of the table at the pressing station and also at the reversing station (or stations, if two are used) prohibits the employment of the automatic water supply system used in conjunction with the apparatus of Figs. 1 to 7. In place thereof I provide an equivalent automatically controlled system which comprises the water supply pipes $13^b$, $13^b$, the discharge pipes $14^b$ $14^b$, and the valve mechanism shown in section at the left of Fig. 14. This valve mechanism consists of a combination sleeve and plug check valve 100 which is fitted to each of the hollow trunnions $4^b$ $4^b$ and a sliding gate valve $22^b$ which is mounted on the upper end of each of the standards 94, and is normally held in elevated (and closed) position by a spring $23^b$. Each of the standards 94 is also provided with a pipe 101 which communicates with the opening in the cover plate of the gate valve $22^b$, and is slidably fitted in the vertical portions of the supply and discharge pipes $13^b$—$14^b$.

The mode of action of the above described water control system is simple and easily understood. When the table is being moved the standards 94 are all lowered to their full line positions shown in Figs. 11 and 14 and all of the parts connected thereto are below the level of the supporting plane of the track wheels $29^b$. When the table has been brought to either of its end positions D or E the trunnions $4^b$ are exactly, or approximately, above the Y supports on the ends of the adjacent standards 94. When these are raised the beveled inner edges of one or the other of these standards first engages the contiguous edge of one of the end strips $9^b$ and moves the table slightly one way or the other until it is exactly centered between the standards (this slight movement being permitted by the "back lash" or clearance of the spur and worm gears $28^a$—$30^a$, etc.). The continued upward movement of the standards next brings the faces of the beveled grooves 102, on the ends of the gate valves $22^b$, into engagement with the coned ends of the sleeve valves 100, and presses them back sufficiently to simultaneously open the central plug closed port and the peripheral sleeve ports $20^b$. Further upward movement depresses the gate valves $22^b$ against the tension of the springs $23^b$—this movement being made positive by the engagement of the lugs 103 with the lower sides of the trunnions $4^b$—and opens the ports leading to the pipes 101. The parts are so designed that, at this stage of the upward movement, the lower ends of the pipes 101 are lifted above the ends of the lateral branches of the pipes $13^b$, $14^b$; and the water now flows from the first of these pipes $13^b$ up through the telescoping pipe 101, through the valve ports in the depressed gate valve $22^b$, and into the opened sleeve valve 100 at the outer, hotter end of the table; and is discharged, in a reverse flow through the corresponding valve system, at the inner end of the table, into the exit or exhaust pipe $14^b$. This flow continues as long as the standards are in lifting contact with the table trunnions—regardless of whether the table is elevated to the reversing position shown in Fig. 13 or is in the lowered position shown in Figs. 11 and 12—but it is automatically shut off when the standard are lowered out of lifting engagement with the trunnions by the joint action of the gate valves 22ᵇ and the telescoping pipe 101. The final step in the lowering movement of the standards disengages the grooved ends 102 of the parts 22ᵇ from the coned ends of the trunnion sleeve valves 100, and permits these valves to be closed by their springs thereby preventing the accidental escape of the water still remaining in the table cavities 21ᵇ and 6ᵇ. But these valves are so constructed that in the event of an excessive pressure being generated in the said cavities (by the heating of the liquid therein during the "teeming" and the rolling and pressing operations) the plug elements at the centers of the valves will be lifted from their seats—against the tension of the closing springs—to relieve such excess pressure. The valves 100 therefore perform both the functions of auxiliary control valves and of "safety" valves; and the latter function has been found to be a particularly important one in rolling and pressing thick sheets of prism glass.

The operation of this rolling-pressing mechanism as a whole is as follows: Starting with the table in the dotted line position E shown at the right of Fig. 11, and with the other parts in the full line positions of Figs. 10 and 11, the table is first moved a short distance to the left—until its end is under the roll 1ᶜ and the side ribs 41ᵇ have engaged with the right hand set of guides 39ᶜ—and a charge of glass is then "teemed" on the table between the "guns" 53ᶜ. The movement of the table to the left is then resumed and continued until the glass spreading operation has been completed, and the table has passed out from under the roll 1ᶜ into its central position P under the press die 73 (as shown in Figs. 12 and 14). The three-way valve 93 is then opened to admit compressed air to the rear end of the cylinder 91. This lifts the table and the glass sheet until the upper surface of the glass comes in contact with the lower surface of the press die 73. The latter surface at once adjusts itself to parallelism with the upper face of the sheet by the rocking of the press frame 78 as a whole, on the cross shaft support 83; and by the further independent movement, if necessary, of the pistons 81 in the cylinders 82. The table continues its upward movement, carrying with it the press die, and lifting the pistons 81 against the pressure of the air in the upper ends of the cylinders 82. A very slight upward movement of these pistons closes the entry ports 85 and the air trapped above the pistons is then uniformly compressed—equalization of the pressure on the top of the four main pistons being ensured by the pipe system 84—to exert, in conjunction with the springs 89, a continually and uniformly increasing pressure on the glass which reshapes and finishes the upper surface thereof to the form and configuration of the lower face of the press die. At the upper extremity of the piston movement the ports 85 are opened to the space below the pistons 81, thereby momentarily reducing the pressure on the glass; and when the three way valve 93 is actuated to discharge the air from the back of the main press piston 91 (and permit of the gravity return of the table to its lowermost position) the compressed air thus admitted to the lower ends of the cylinders 82 retards the return movement of the die 73, and causes the latter to be gradually and gently withdrawn from the pressed glass surface instead of being suddenly separated therefrom at the plane of initial contact. This momentary relief of the pressure at the end of the reshaping or refiguring action, and the subsequent gradual "parting" of the glass and die surfaces, has been found to be of great importance and advantage, in the pressing operation, because of the tendency of the hot glass to "stick" to the die surfaces; and it has required a very skillful manual manipulation of the valves of the press mechanism heretofore used to overcome this tendency.

When the table has once more been lowered onto its supporting track wheels it is moved again to the left to the full line position, D, (as shown in Figs. 10 and 11). The pressed sheet is then shoved from the table into the receiving chamber, a of the lehr system F; the first formed of this sheet being in advance. The standards 94 are then elevated until they engage the trunnions 4ᵇ, and the valves 100 and 22ᵇ are automatically opened (as before described) thus establishing a flow of water through the table ducts 6ᵇ in the same direction as that in which the sheet was first spread. At the proper time the standards 94 are raised to the position shown in Fig. 13 and the table is reversed and then lowered again. After the proper cooling interval has elapsed the standards 94 are drawn down out of engagement with the trunnions 4ᵇ—thereby automatically shutting off the flow of water through the table—and the spreading roll 1ᵇ is lowered until the guide plate 39ᵇ is in position to engage the table ribs 41ᵇ. The parts are now in position and condition to repeat the above described sequence of steps, with the reverse direction of table movement, and form another sheet which is pushed in turn into the receiving chamber of the right hand lehr system G.

The bidirectional operation of my reversible-table-multiple-lehr system is particularly advantageous in the manufacture of high grade pressed plate products, because these rolled-pressed plates are, as a rule, of smaller size, and of greater proportionate thickness than plain rolled sheet products; and, because of their being relatively thicker, and also relatively more chilled (by the pressing operation), they are more difficult to anneal properly. In consequence of this the length of time during which each plate must "rest" in each annealing chamber of the lehr is increased. The longer enforced "wait" between each rolling-pressing performance (in the ordinary unidirectional operation of the unifaced-table-single-lehr combination heretofore employed), and the smaller superficial area of each plate produced (in the ordinary practise of this two step process) greatly reduces the output from each machine and correspondingly increases the cost to such an extent as to seriously limit the demand for this class of products. One of the above mentioned factors of increased cost—viz, the limitation in the size of the rolled-pressed plates—can be eliminated by the use of the three step process of rolling-reheating-and-pressing, which is described and claimed in my copending application Ser. No. 802,311; but the method there disclosed does not increase the speed of operation of the machine, i. e., it does not reduce the interval between the manufacture of successive sheets. But the use of the process and apparatus herein described increases the output of each machine between three hundred and four hundred per cent; and both the labor cost and overhead expense of manufacture is thereby so greatly reduced as to make it possible to market these high grade pressed plate products at a price comparable with that now asked for ordinary rolled sheet glass. This is a very remarkable advance in this branch of the glass working art.

The bidirectional operation of the reversible-table-multiple-lehr combination also presents another important advantage in the manufacture of plates which are first rolled and then pressed (either with or without an intermediate reheating of the rolled surface). In the ordinary manufacture of these products the "wait" between successive pressing operations is so prolonged—for the reasons just stated—that the pressing die must be maintained at the proper working temperature by some extraneous heating instrumentality. This is undesirable (although heretofore necessary) both because of the expense, and also because the heating means usually employed (on the score of convenience and economy) is a series of gas jets that are manually placed in position under the die after each pressing operation and taken away again just before the next rolling operation. It is impossible to obtain in this way a uniform and symmetrical heating of all portions of the die surface and it is also impossible to avoid the oxydation and tarnishing of the pressing faces, which must be kept in a highly polished clean condition in order to obtain the best results. By the use of my present invention the interval between successive pressing operations is so greatly reduced that the die is maintained at the proper working temperature by the heat imparted to its from the glass alone; and all necessity for extraneous heating between such operations is completely eliminated.

The successive or alternate spreading of the molten material in reversed direction, and on the opposite sides of the reversible two faced rolling table, and the intermediate internal cooling of the metal between these two rolling surfaces by successively reversed currents of cooling fluid—which results in the maintenance of substantially uniform average temperature conditions in different parts of the table—is also of particular importance and advantage in the successful pressing of rolled plates of large size, because it eliminates in large part the effects of the "bowing" or convexing of each table surface when the mass of intensely hot glass is "teemed" and spread upon it; and thereby avoids the necessity of imparting a large compensatory or corrective concavity either to the table surface (with a corresponding longitudinal curvature to the roll surface—or to the die surface, or to both combined—as described in my earlier Patent No. 952,390—which it has heretofore been necessary to do in order to obtain a satisfactory pressing or refiguring action on any extended area of freshly rolled molten material. This reducing of the "bowing" effects—or rather the balancing of the alternately reversed bowing effects—on the twin rolling surfaces of the table, also eliminates the necessity for using the massive and cumbersome "backing plate" heretofore employed for holding the pressing die in mechanically adjusted or warped condition; and permits of the mounting of that die directly on its spring supports in the manner hereinbefore described, thereby reducing the cost of construction and simplifying the operation of mounting and dismounting this frequently changed element of the mechanism.

In the manufacture of pressed plates that are of the maximum size for which the apparatus shown in Figs. 10–16 is designed, and which are of unusual thickness (e. g., skylight or floor prism glass), or which are formed from material which has a relatively high thermal conductivity (e. g., baryta-lime-glass, etc.), the intermittent local heating of the rolling surface is much greater (and the resultant warping or bowing of that surface is correspondingly more pronounced) than in the manufacture of ordinary plain rolled sheet glass. Because of this, and because of the necessity of establishing and maintaining a very exact parallelism between the face of the pressing die and the glass surface to be refigured thereby, it is sometimes desirable to utilize in part the invention of my earlier Patent No. 952,390 (hereinbefore mentioned) in conjunction with my present improvements. This can be done either by making both of the twin rolling surfaces slightly concave (so that the table is thinner in the middle than at the edges) or by making the press die so thin and of such cross section that the central portion of it will bend upward when it is brought into pressure contact with the rolled out convex glass surface. This last described action is facilitated and assisted by the arrangement of reaction pressure cylinders 82, and 90, shown in Figs. 12, 14 and 16, which is obviously adapted to exert the greatest restraining force on the four corners of the suspended die, and present a much less resistance to the upward movement of the central parts thereof; and the freedom of automatic surface adjustment attained in this manner is further increased by the elimination of the usual heavy "backing" plate and the bolting of the press die thereon in a state of initial mechanical strain.

My present invention—as applied to the manufacture of pressed plate products—may therefore be utilized in some cases as a complete substitute or alternative for the process and apparatus described and claimed in Pat. No. 952,390, and in other cases as a most effective supplement or complement to the said earlier invention. In any case the two inventions are obviously capable of conjoint use whenever the occasion and the conditions make such use desirable or advantageous.

The form of apparatus illustrated in Figs. 10 to 16 can also be employed very effectively in the conjoint and concurrent production of pressed plate products and rolled sheet products, with either plain or figured surfaces. In that case one side of the double faced table, and one of the lehr systems (F or G) is used in rolling out and annealing the unpressed product and the opposite side of the table and the other lehr system is utilized in the production and tempering of the pressed plates. As already explained ordinary rolled sheet products are, as a rule, thinner than pressed plate products; and for this reason (and for the further reason that they are not chilled or thermally strained by any pressing of the surface) the rolled sheets are more easily annealed or tempered, and can be shoved through the lehr chambers more rapidly, than is permissible with the pressed plates. The table surface is likewise less heated in the formation of the rolled sheets than it is in the "teeming" and spreading and subsequent pressing of the larger masses of molten material contained in the rolled-pressed plates. For these reasons I preferably form two rolled sheets in succession by spreading the molten glass in the same direction (say from left to right) and on the same side of the rolling table $3^b$, and shove these sheets into the lehr chambers F, at the opposite (or left hand) end of the machine. I then reverse the table—while it is being cooled by water circulation—roll out a thicker sheet in the reverse direction (from right to left), press its surface to the desired configuration and shove it when finished into the receiving chamber of the other (right hand) lehr system G. I then reverse the table again and continue the above described sequence of steps. I thus produce on one machine a certain number of plates of rolled-pressed product (which is twice the number that can be produced in the unidirectional operation of the ordinary single-table-one-lehr system); and concurrently produce on the same machine a double number of sheets of rolled product— the multiplied output of the two products being attained without any increase in the labor cost of the machine operations, and without any conflict of the differing conditions for the proper manipulation and tempering of the two lines of production.

In some cases I prefer to vary the above described procedure by rolling only one sheet between each successive rolling-pressing operation, so as to produce an equal number of pressed plates and rolled sheets. In such cases the sequence of operations is the same as in the use of the machine for pressed product alone, save that each alternate sheet is left unpressed; and in the annealing of this unpressed product only a single lehr, such as is shown in Fig. 8, (or one branch only of the double lehr of Figs. 1 and 10) need be provided at one end of the machine.

The rolling mechanism shown in Figs. 10 to 16 may also be provided with wire mesh chutes similar to those shown in Fig. 7; and the apparatus will then be adapted to produce wire glass—with either plain rolled or pressed surfaces—by the two layer or "sandwich" process heretofore described. But in producing pressed wire glass I prefer to make use of the one sheet process described in my Patent No. 844,485; and this can be done by substituting a circumferentially grooved roll (such as the one illustrated and described in the said patent) for the plain faced roll $1^b$ or $1^c$ (or both). The modified rolling-pressing instrumentalities are then adapted to the manufacture of either wire glass alone, or of wire glass and unwired glass concurrently—the pressed upper surface of one or both products being either plain and smooth (if "semi-plate", sic, is to be made) or figured in any desired pattern, if prism glass or ornamental glass is wanted.

It will also be apparent that the rolling-pressing apparatus above described—as used either in the form illustrated in Figs. 10 to 16 or in the modified forms last considered—is most admirably adapted to the practice of the multiple-layer-rolling-pressing operations described in my earlier Patent No. 872,484; and is therefore capable of rapidly and economically manufacturing a number of composite plate products, that can only be produced at great cost, by the use of a single table one lehr combination, because of the greatly extended period of annealing required for these large thick plaques of poorly conductive vitreous material.

My present improvements are also capable of being very effectively used in conjunction, and in combination, with the invention disclosed in my pending application Ser. No. 802,311, which relates to the manufacture of pressed plate products in very large sizes. As pointed out in the last mentioned application the production of such plates by the two step rolling-pressing process has always been restricted and limited, in part by the difficulties of overcoming, or compensating for, the greatly magnified warping or bowing of very large tables, and in part by the difficulties of maintaining all parts of large rolled sheets at the proper temperature for the subsequent pressing operation (and also by various subsidiary constructional difficulties which pertain to the apparatus employed rather than to the mode of procedure). These difficulties are all overcome by the use of the three step rolling-heating-pressing process—and the apparatus designed for the practice thereof—which is illustrated and described in my aforesaid prior application; but the speed of operation that can be attained in the employment of the invention, as there described, is limited and determined by the necessary period of "rest" of the pressed sheets in each lehr chamber. This limitation is avoided by the extension or application of my present invention (involving the bidirectional operation of a reversible-table-multiple-lehr system) to the three step rolling-heating-pressing process of my previous application; and one means by which this can be accomplished is shown more or less diagrammatically in Figs. 17 and 18, which will next be described as briefly as possible.

In the combination of instrumentalities illustrated in Fig. 17, I preferably employ two double faced rolling tables $3^d$ and $3^e$ each of which is similar in construction to the tables shown in Figs. 6–14 and 15 (hereinbefore fully described) save that it is provided with side trunnions $4^d$ $4^d$ which are rotatably mounted in the side bars of the open box frames $5^d$, $5^e$, so that when the table is reversed, side for side, it is simultaneously turned end for end. The table frames are provided with track wheels $29^d$, $29^d$, that roll on tracks 105, which are divided into five sections—two rolling station sections carried on the lateral or cross transfer carriages 106, 106, two stationary end sections extending into the reheating furnaces $R^1$ and $R^2$ and a stationary central section extending under the press mechanism P. The two transfer carriages 106, are mounted on track wheels that roll on cross tracks 107—107, so that the said carriages—and the rolling tables supported thereon—may be moved from the positions D or E to either of the positions $D^1$ and $D^2$, or $E^1$ and $E^2$ respectively; and in these positions, the tables are opposite the first chambers or ovens of the annealing lehr systems $F^1$, $G^1$ and $F^2$, $G^2$. The spreading rolls $1^d$, $1^e$, are revolvably mounted on stationary shafts that are supported for vertical adjustment—(either on eccentric end gudgeons as in the Figs. 1–5 construction, or on screw actuated housing blocks of the well known form commonly used in rolling mills, planers, etc.—as indicated in Fig. 18) —with respect to the rolling table supports; and the rolls and table frames can be actuated synchronously by means of two endless cables $60^d$ $60^d$ that are arranged, one on each side of the machine frame, and are moved at will in either direction by the connected driving drums $62^d$ $62^d$. The pressing mechanism at the center of the machine comprises a fluid pressure cylinder $91^d$, and a system of intercoupled bell crank levers and links (the action of which has been fully described in my earlier Patent No. 789,397) that are connected to the die plate $73^d$ through the medium of the spring suspension members $82^d$ $82^d$, etc;—the parts being normally maintained in the elevated full line positions of Fig. 18 by the counterweights 108, 108, etc.

The adjustable roll shaft supports, cable sheaves and drums, and press mechanism—as well as portions of the end sections and center sections of the tracks 106—are carried on a rigid structural steel framework comprising the columns $2^d$, $2^d$, etc., the longitudinal girders $34^d$, and the cross beams $35^d$, that are so arranged as to permit of easy access to all operating elements of the sheet forming mechanism, and to permit of the ready removal and replacement of the spreading rolls, or of the rolling tables, or of the press die or dies.

The reheating furnaces $R^1$ $R^2$ are of the same general construction as that shown in Figs. 10 and 11 of my copending application Ser. No. 802,311. Each of these furnaces has a heating chamber 109 which is of somewhat less length and width than the sheet of glass which is rolled out on the table; and each is provided with two longitudinal grooves or channels 110, in the lower portion of the side walls of the chamber for receiving and shielding the end sections of the tracks 106, and admitting and protecting the edges of the table, and the supporting frame therefor, when the latter is moved into the chamber (as shown at the right of Fig. 18).

The devices for establishing and maintaining a water circulation through the longitudinal passage ways of the reversible tables $3^d$, $3^e$, are shown in Fig. 19. In this construction each end strip $9^d$ of the table is centrally bored to receive a combination-sleeve-plug-valve $100^d$ similar to that shown in section in Fig. 14. The end bars of the frame $5^d$ are correspondingly bored to receive a longitudinally movable hollow plug 111, the inner end of which is reduced in size to fit into the hollow sleeve $100^d$, and the outer end of which is enlarged to form a head 112 that serves jointly as a stop, and as a means for moving the plug outwardly. A delivery or supply pipe $13^d$ is placed at the outer end of each reheating furnace, and a sleeve valve 113 is mounted at the upper end of this pipe in such position as to engage with the outer end of the hollow plug 112, when the table has been run into position in the furnace chamber 109, and simultaneously open the ports of the two valves $100^d$ and 113 so that water will flow from the pipe $13^d$ into the outer ends of the table passage ways. The water will escape through the plug member of the valve $100^d$ at the opposite end of the table, and either flow out into an open trough placed below the level of the tracks 105, or will be preferably carried away through a movable section of pipe mounted at the upper end of the discharge conduit $14^d$, and so arranged that it can be swung up into engagement with the end of the plug 111 after the table is in position in the furnace. (See Fig. 19.)

Fig. 19 also illustrates in detail the means employed for connecting the table support $5^d$ to the driving cables $60^d$. This connection is conveniently effected by an equalizer bar 115, which is detachably secured at its ends to the driving cables $60^d$, and a link 116 which connects the center of the equalizer bar with the end of the table frame $5^d$.

The cycle of operations followed in the normal use of the apparatus illustrated in Figs. 17 to 19 is as follows: Starting with all the parts in the positions indicated in full lines in Figs. 17–18, the table $3^d$ is first moved slightly to the left until its end is under the roll $1^d$. The roll and the guns $53^d$ are then lowered to operative position and a charge of glass is "teemed" on the left hand end of the table just in front of the roll. The molten mass is next rolled out into sheet form by moving the table to the left under the roll, and this movement carries the table with the sheet of glass thereon into the reheating furnace $R^1$. At the end of this movement the plug 112 engages the end of the sleeve valve 113 and admits the water from the supply pipe $13^d$ to the table passages. The exhaust or exit connection $14^d$ is then swung up to engage with the end of the plug 111 at the inner end of the table. The connection between the driving cables $60^d$ and the table frame $5^d$ is then uncoupled, by releasing the clamps which hold the ends of the equalizer bar 115 to the cables. The ends of the equalizer bar 115 at the right hand end of the machine (which is connected to the frame $5^e$) are then clamped to the cables, and the latter are set in motion to draw the table $3^e$ from the reheating furnace $R^2$ and carry it to the central pressing station P. This withdrawal movement automatically breaks the connections between the inlet and outlet pipes, $13^d$ and $14^d$, and the table, thus interrupting the flow of water through the latter. When the table has been brought under the pressing die $73^d$ the three-way valve $93^d$ is opened to admit air to the cylinder $91^d$ and force the die against the softened and leveled upper surface of the reheated glass on the table $3^e$. After a short interval the air is released from the cylinder $91^d$ by turning the valve $93^d$ to its discharge position and the die is then lifted from the glass by the action of the counterweights 108. The table $3^e$ is now moved back again to position E, and the link 116 is disconnected from the equalizer bar 115, by removing the coupling pin 117; and the transfer carriage 106 is then moved to one side to carry the table and the finished sheet of glass thereon to the position $E^1$ (or $E^2$), after which the now cooled glass plate is shoved into the first chamber or oven of the lehr $G^1$ (or $G^2$) with the first formed end in advance. The plug connections 112 at each end of the table are then disengaged from the sleeves $100^d$, and the table is reversed by turning it over on the trunnions $4^d$ $4^d$, (suitable depressions being provided in the factory floor to permit of this movement), and the plugs 112 reinserted in the adjacent sleeve sockets. The transfer carriage is next returned to the rolling station E and the table support $5^e$ is recoupled to the right hand equalizer bar 115 by replacing the coupling pin 117. The table is then moved a short distance to the right to bring its advancing end under the right hand roll $1^e$ and this roll, with its cooperating guns $53^e$, is lowered (as by the use of the screw gear and hand wheel $45^e$ indicated in Fig. 18), to spreading position. A charge of glass is now poured on the table in front of the roll; after which the table is passed under the roll and into the reheating furnace R² (to the full line position shown in Fig. 18). The right hand equalizer bar 115 is then unclamped from the cables 60ᵈ and the roll 1ᵉ (with its cooperating guns 53ᵉ) is again raised to carry the parts out of the plane of the subsequent return or withdrawal movement of the reheated glass surface. The left hand equalizer or draft bar 115 is then reclamped to the driving cables and the table 3ᵈ is withdrawn from the furnace R¹ and transferred to the central pressing station P. After pressing the sheet of glass on this table, the latter is returned to the position D, and then moved, on the transfer carriage 106, to the position D¹ (or D²); and the pressed and finished sheet thereon is shoved into the first oven of the lehr F¹ (or F²); after which the table is first reversed (as before described) and then returned to position D. The above described sequence of steps is then repeated—the sheets of glass successively produced on the double faced tables 3ᵈ and 3ᵉ being "shoved" in alternate or successive order into and through the chambers of the lehr system F¹ (or F²) G¹ (or G²) F² (or F¹) G² (or G¹).

It will be clear that the action of the furnaces R¹ and R²—in reheating and softening the upper side or upper surface layers of the rolled out glass sheet and in simultaneously heating the opposite or lower side of the glass support (by radiation from the hot floor of the furnace chambers—cooperates with the equalizing action produced by alternately spreading the glass on opposite sides and from opposite ends of the bifacial rolling tables, to remove very effectually and very completely the warping and bowing of the upper surface of the table (caused by the "teeming" and spreading of the glass sheet thereon); and that these cooperating physical actions, inter alia, result therefore in reducing the upper surface of the rolled out and reheated glass sheet to such a condition of flatness or planeness—as well as softness—as will permit it to be uniformly and effectively refigured and finished by the press action of a flat die of the full size of the completed plate—thus eliminating the many serious difficulties that have heretofore been encountered in the production of pressed plate products in very large sizes. It is true that these difficulties may also be overcome by the use of the three-step rolling-heating-pressing method (as disclosed in my copending application Ser. No. 802,311) alone; but this involves a longer treatment of the sheet and table in the reheating furnace; with a consequent curtailment of output. In increasing the speed of working, per se the bidirectional glass spreading operation (on longitudinally reversed tables) also cooperates effectively with the cooling of the interior portions of the glass supports while the latter are in the reheating furnaces—as it permits of the maintenance of a higher temperature in those furnaces, and also assists in the complete equalization of temperature conditions on the opposite sides of the rolling tables—and the acceleration of the rolling-heating-pressing procedure due to these cooperating actions is directly complemented and consummated by the employment of the multiple-lehr system of distribution. In all of these respects the improvements set forth in the present application may be regarded as supplemental or complemental to the invention described in my prior application Ser. No. 802,311; and conversely this application is, pro tanto a continuation of the earlier one.

Fig. 20 illustrates a modified arrangement and combination of rolling-heating-pressing apparatus with a reversible table-multiple-lehr system, in which more than two tables, and more than four lehrs, may be employed if desired. In this illustration the pressing station P is positioned between the reheating stations R¹ and R²; the rolling stations D and E are positioned at the opposite outer ends of the said reheating stations; and the lehr systems F¹—F², G¹—G², are in turn located beyond or outside of the rolling stations and the auxiliary delivery stations D—D¹, and E—E¹. In this arrangement each table is mounted on end trunnions, (as in the first described construction of Figs. 1–7) and is thus reversibly supported in open box frames similar to those shown in Figs. 17 to 19, and also in Fig. 24 (5ᵍ). These frames are movable longitudinally on a track system 105ᶠ which extends from the rolling stations D and E through the reheating stations R¹ and R² to the central pressing station P; and this track system is divided, as in the previously described arrangement, into five sections; the two outer sections (at the rolling stations D and E) being supported on transfer carriages that can be moved laterally on the cross tracks 107ᶠ to carry the tables from positions D¹ to D and E¹ to E (or vice versa). The central section, at the pressing station is, in this case, also mounted on a laterally movable transfer carriage that is provided with two parallel lines of track, 105ᶠ and 105ᵍ, either of which may be brought, at will, into alignment and registry with the outer sections of the track system 105ᶠ—this double track transfer carriage being substantially identical with that shown in greater detail in Figs. 10 and 12 of my copending application Ser. No. 802,311 hereinbefore referred to. The double track transfer carriage is movable laterally under the press mechanism on cross tracks 120; and two auxiliary transfer tracks 121 and 122, arranged on the same level as the tracks 105, are disposed on opposite sides of the reheating stations $R^1$ and $R^2$ respectively; the arrangement being such that when one track section $105^f$ on the double track transfer carriage is in alignment with the remaining track sections $105^f$, the other of said sections $105^g$ is in registry and alignment with the tracks 121; and when the said transfer carriage is moved so as to bring the section $105^g$ into line with the adjacent sections of track $105^f$, the central section of that track will be in registry and alignment with the tracks 122.

The system of sheet forming and annealing instrumentalities last described is most efficiently operated when three reversible rolling tables are employed; and when thus operated the cycle of procedure is as follows: Starting with a filled table in each of the reheating stations $R^1$ and $R^2$ (which I will designate respectively as tables No. 1 and No. 2) and an empty table at the rolling station D (which I will refer to as table No. 3): A mass of glass is teemed on table No. 3 at the left of the roll $1^r$ and spread out on that table by moving it to the right into the heating furnace $R^1$. This movement pushes table No. 1, already in $R^1$ out of that chamber and under the press P where the reheated and softened and flattened sheet of glass thereon is pressed. Table No. 1, carrying the pressed sheet, is then moved sidewise, from under the press, (by the lateral movement of the double track transfer carriage) to the position $T^2$ in which the track section on which it rests is in line with the tracks 122, and the parallel track section $105^g$ is aligned with the remaining track sections $105^f$. This table No. 1 is next moved, over the track section 122, onto the right hand transfer carriage at station $E^1$; the sheet thereon is shoved into the first chamber of lehr sysem $G^2$; and the emptied table is reversed (on its end trunnions), and moved on the transfer carriage to position E. A fresh charge of glass is then poured on this table (No. 1) and rolled out by moving the table to the left, under the roll $1^g$, into the reheating furnace $R^2$. This movement, in turn carries table No. 2, in $R^2$, under the press mechanism P; and after pressing the sheet of glass thereon, the said table is first moved sidewise to position $T^1$ (by the lateral return movement of the double track transfer carriage from its last described position) and is then moved longitudinally over the tracks 121 onto the left hand transfer carriage (which, after the rolling of the sheet on table No. 3, was moved to position $D^1$); after which the finished sheet of glass is slid into the first oven of the lehr $F^1$; and the table (No. 2) at $D^1$ is reversed; and moved to the rolling station D, ready for a repetition of the above described sequence of steps, with a new order of table movements (table No. 2 now taking the place of table No. 3, table No. 3 the place of table No. 1, and table No. 1 the place of table No. 2) and a corresponding alteration in the lehr delivery and table reversing operations—the sheet next pressed on table No. 3 (from $R^1$) being moved, on its table, successively to positions P, $T^2$, $E^1$ and E, and then shoved into the first chamber of the lehr $G^1$ (after which table No. 3 is reversed at E); and the sheet subsequently pressed on table No. 1 (from $R^2$) being moved, successively to positions P, $T^1$, $D^1$ and D and then slid into the first chamber of lehr $F^2$ (the table No. 1 being then reserved at D).

In order to secure the full advantages of the three table system of operation last described it is desirable in some cases to correspondingly increase the number of individual lehr systems that form a part of the structual combination. This can easily be done by arranging a fifth lehr $H^1$ in the position indicated in dotted lines in Fig. 20 (so as to receive sheets that are shoved sidewise from the supporting tables when they are at station $T^1$) and by placing a sixth lehr, if desired, on the opposite side of the press mechanism (as indicated by $H^2$) to receive sheets that are slid sidewise from the tables when they are moved to station $T^2$.

Another effective four lehr arrangement is obtained by using lehrs $F^1$—$H^1$—$H^2$ and $G^2$ in combination—the lehrs $F^1$ and $G^1$ being omitted or left idle. The particular advantage of this combination is that the lehrs $F^1$ and $H^2$ (and $H^2$ and $G^2$) discharge their annealed product in relatively close proximity to each other.

Fig. 21 illustrates another diagrammatic grouping of four lehrs around the linear arrangement of rolling-heating-pressing instrumentalities that is shown in Fig. 20. In this construction two or more transfer tables 123, 124 and 125 are mounted respectively on pivot supports 126, (or $126^a$) 127 and 128,—(the opposite ends of the tables being supported on castor wheels that roll on the factory floor or on track wheels that are guided by the curved tracks 129, 130)— which are so arranged as to permit the said tables to be swung into parallelism with the rolling table at the pressing station (as indicated by the full line positions of tables 123 and 124) or into endwise alignment with the first chambers of the lehr systems $F^1$ (or $F^2$) $G^1$ and $G^2$ respectively (as shown by the dotted line position of table 123 and the full line position of table 125). Only two rolling tables $3^r$ and $3^g$ are used in this arrangement; and these tables are provided with track wheels 131, 131, etc. etc., which are revolvably mounted on stud shafts projecting from the edges of the tables, and which roll on tracks 132 that extend in an unbroken line from one rolling station D to the other station E. At each of these end stations the tracks 132 are provided with short sections 133, 133, etc.—(that are slightly longer than the diameter of the wheels 131)—which can be moved outwardly far enough to clear the ends of the wheels and their stud shaft supports;—as indicated in dotted lines in the end view (Fig. 23) of the rolling table and its track supports—by means of the connected levers 134, 134, etc., that can be actuated conveniently by means of the hand grips 135, or in any other desired manner.

In the operation of this last described system sheets of glass are first rolled out on both of the tables $3^f$ and $3^g$, by moving them under the rolls $1^f$ and $1^g$, and these tables and sheets are then carried into the heating furnaces $R^1$ and $R^2$ respectively. The first rolled sheet (e. g., that on the table $3^f$) is then withdrawn from $R^1$ carried to the pressing station P and pressed. The figured sheet is next slid sidewise from the table $3^f$ onto the transfer carriage 123; the latter is swung around to the dotted line position of Fig. 21 and the glass plate is shoved endwise—with is first formed end in advance—into the receiving oven of lehr $F^1$. While this is being done the table $3^f$ is returned to position D and the movable track sections 133 are drawn outwardly, leaving the table supported only on its two center track wheels 131, and free to be reversed end for end (and simultaneously turned side for side) on the stud or trunnion supports of these wheels. After reversal the sliding sections 133 are returned to their full line position, in which they form a part of the tracks 132. A new charge of glass is next "teemed" and spread on the table $3^f$ and the latter is again carried into the furnace $R^1$. The table $3^g$ is next drawn from $R^2$ and the same pressing-transfer - return - reversal - respreading-procedure repeated with this unit, with the exception that the transfer carriage 123 (after being swung back to full line position) is disconnected from the left hand pivot 126 and connected to the right hand pivot $126^a$—by moving in the right hand pivot bracket $126^b$ and moving out the corresponding left hand bracket—and the pressed sheet is swung around on this carriage in front of the lehr $F^2$ and transferred thereto. Then the table $3^f$ is again removed from $R^1$ and the sheet thereon pressed and transferred to table 124 by which it is in turn transferred to the receiving oven of lehr $G^1$—the next sheet that is pressed on table $3^g$ being in its turn received on table 125 and transferred to lehr $G^2$.

In the operation of the systems shown in Figs. 20 and 21 the table is passed clear through the reheating furnaces, and in order to automatically establish and maintain a circulation of water through the tables while they are positioned in the reheating chambers, I employ the control valve arrangement shown in Fig. 24. In this arrangement each end strip $9^g$ is provided with a central sleeve-plug valve $100^g$ which is engaged by the hollow plug $111^g$, that is closed at the outer end and is provided with ports that communicate with the passage way 136 in the block 137 in which the plug is mounted. In the system of Fig. 20, in which the tables are mounted on end trunnions and supported in track frames, $5^g$, the blocks 137 are secured to the ends of the said frames; while in the system shown in Fig. 21—in which no track frames are used—the blocks are preferably carried on cross bars that slide on the tracks 132 and are detachably clamped to the ends of the tables after each reversal. The blocks 137 project slightly below the lower face of the frame $5^g$ (or the table $3^g$), and are adapted to slidably engage the upper surfaces of the valve cages 138 which are fixed on the track systems $105^f$ (or 132) at each end of the reheating furnaces $R^1$ and $R^2$. A bell crank lever 139 is pivoted to the block 137 in such position that its long arm is pressed against the end of the plug $111^g$ when its short arm is engaged by the button headed stem of the valve $22^g$ which controls the flow of water from the inlet pipe $13^g$ to the interior of the valve casing 138. This valve casing is further provided with a port 140, which is to one side of the line of engagement between the lever 139 and the head of the valve $22^g$; and in such position as to register with the elongated opening at the lower end of the passage way 136 when the said lever and valve head are in contact with each other.

The action of this water control valve mechanism is as follows:. When the right hand table $3^g$ is run into position in the reheating furnace $R^2$ the lower end of the lever 139 engages the head of the valve $22^g$ at the inner end of the said furnace (i. e., the end next the pressing station P) and simultaneously opens that valve, and the sleeve plug valve $100^g$, thereby allowing water to flow from the inlet pipe $13^g$ through the port 140 and passage 136 to the hollow plug $111^g$ and thence into the passages $21^g$ and $6^g$ at the hot end of the table, (on which the glass was teemed) from which it is discharged, through the corresponding valve system at the opposite end into the exhaust pipe $14^g$ (not shown) that is positioned at the outer, or right hand, end of the furnace $R^2$. Water is similarly supplied to the table $3^f$ when it is in the furnace $R^1$ by a reversed arrangement of inlet and outlet valve systems; the inlet systems being in each case located at the inner ends of the reheating furnaces so that the flow of water is always from the hotter to the cooler ends of the rolling tables.

In the arrangement of parts illustrated in Fig. 21—and the same arrangement may be employed if desired in the system shown in Fig. 20—the spreading rolls $1^f$ and $1^g$ are spaced sufficiently far enough away from the adjacent ends of the reheating furnaces $R^1$ and $R^2$ to permit of the rolling of multiple layer sheets (of either homogeneous or reinforced vitreous material). In making such sheets the first layer is preferably spread by moving the table toward, and partly into, the reheating furnace—so as to keep the first rolled end of the sheet from chilling—a second charge of glass is then poured on the last formed end of the first layer, between the reheating furnace and the roll; and the latter having been raised by the required amount, the second layer is spread on the lower one by a reverse outward movement of the table; after which the composite plate and its support are run forward again into the furnace (in which movement a third layer may, if desired, be rolled on top of the first two) and left there, as before, until the upper side of the multiple layer blank is sufficiently softened and flattened to permit of its refiguring and finishing at the pressing station. If it is desired to "reinforce" this multiple layer product, that can easily be accomplished by rolling in a sheet of wire mesh or other suitable reinforcement between any two successive layers in the manner heretofore described.

The unilinear, bilateral combination of pressing-heating-rolling-and-annealing instrumentalities, such as is shown in Fig. 20, for example, can also be advantageously used in producing fire finished pressed plate products, by either a three step process of rolling-pressing and fire-finishing, or a four step process of rolling-reheating-pressing and fire finishing. In carrying on this procedure only two tables are employed and these are mounted on side trunnions (as in the constructions shown in Figs. 17 and 19, and Figs. 21 to 23) for bidirectional reversal. These tables are mounted, for endwise movement only, on a single track system like that shown in Fig. 21 (tracks 132)—all lateral transfer carriages and auxiliary branch tracks (such as 121—122 etc.) being dispensed with—and the twin lehr systems at each end of this single track are preferably constructed as shown in Fig. 1; i. e., with a common central receiving chamber, $a$, and a bilateral series of communicating ovens or stations $b$—$c$—$d$—$e$, and $b'$—$c'$—$d'$—$e'$. In this last described arrangement of sheet forming and annealing instrumentalities, the glass is first spread, say on the left hand table, and carried into the heating furnace $R^1$. If the sheets to be produced are of small or moderate size (say up to 72 by 96 inches) no period of "rest" in the furnace $R^1$ is necessary; and the table is carried right on through the heating chamber to the central station P, where the glass is pressed. The table and the pressed sheet are then returned to the furnace $R^1$ and left there until the pressed surface has been "fire polished". In order to most effectively carry out this "fire polishing" operation the combustion conditions in the furnace chamber are so regulated as to produce a "smoky" flame at the time when the pressed plate is first introduced; and then, after a thin film of carbon has been deposited on the exposed glass surface, the air supply is increased to obtain a "clear flame" which burns off the carbon film and imparts a lustrous "fire finish" or "fire polish" to that surface. While this "fire polishing" operation is going on another sheet of glass is rolled out and pressed on the right hand table, and this table is returned to the furnace $R^2$. The finished "fire polished" sheet is then withdrawn from the furnace $R^1$ and pushed into the receiving chamber of the left hand lehr system. The table is then reversed (end for end and side for side) and another sheet is rolled out and pressed and returned to $R^1$. The finished sheet in $R^2$ is then withdrawn and pushed into the receiving chamber of the right hand lehr system; the table on which it rested is removed as before and the operations continued in the above described sequence.

If the plates are of very large size the order of procedure is modified to permit the rolled out sheets to remain for a time in the reheating furnaces before pressing. In the modified procedure a sheet is rolled and carried into the adjacent chamber (say $R^1$); and there subjected, on its upper surface, to the action of a high temperature clear flame. While this sheet is being resoftened and flattened out by the action of this furnace, another sheet is formed on the other table and carried into the second furnace $R^2$ for similar treatment therein. The resoftened and flattened sheet is next withdrawn from $R^1$; moved to the central station P and there pressed. Immediately upon the withdrawal of the sheet from $R^1$ the combustion conditions in that furnace are changed (manually, or automatically by the movement of the table to the right) so as to fill the heating chamber with a low temperature "smoky" flame. After pressing, the plate is returned to $R^1$ to be there "fire polished" by the action, first of the smoky flame, and then of a medium temperature clear flame—the temperature required for "fire polishing" being, on the whole, less than that necessary for the reheating operation. The resoftened and flattened plate in R² is next transferred to the pressing station and there refigured or finished by the action of the press die; after which it is returned to R² for "fire polishing." The pressed and fire polished plate in R¹ is then withdrawn from that furnace and transferred to the left hand annealing chamber, a. The emptied table is then reversed to receive another charge of glass which is rolled out as before and carried into R¹—the temperature in that furnace having in the meantime been raised by increasing the fuel supply. The operations are continued in the above described order as long as may be desired.

In the use of the last described arrangement of apparatus in the manner above set forth, the finished sheets are shoved into the lehr chambers with the last formed end in advance; and in that respect the procedure does not fully embody all of my present improvements. But the advantage of pushing the finished sheet into the lehr with the first formed end in advance is not so important in the case of sheets that have been reheated before pressing (or heated both before and after pressing) as it is in the case of sheets that are rolled only— or rolled and immediately pressed—and then shoved directly into the annealing chambers; for the reason that the temperature conditions in the sheet are much more uniform in the first case than they are in the latter.

With the various disclosures hereinbefore set forth as a guide, it will be easy for those skilled in the art to make other applications of my improved procedure, to various lines of sheet and plate glass manufacture; and to design other forms of apparatus capable of practising my invention under special conditions that may be imposed in particular plants. Many such conditions have been already considered, and provided for in practice, but it is manifestly out of place to consider and discuss all of them in detail in this specification.

I do not herein claim many of the special features of operation and construction of the various systems which I have illustrated and described as suitable for the production of pressed plate products; because it is my purpose to file divisional applications relating particularly to these special features.

What I do claim herein is:

1. The method of reducing the thermal distortion of glass rolling mechanism and of equalizing the temperature conditions therein by spreading successive masses of molten material in alternately reversed directions on the opposite sides of an invertable table and removing each spread mass therefrom before the inversion thereof.

2. An improvement in the manufacture of glass sheets or plates which comprises the spreading of successive masses of molten material in opposite directions and on the alternately reversed sides of a two faced reversible rolling table, and removing each spread out mass therefrom before the reversal thereof, thereby equalizing the temperature conditions on the two faces of the table and the parts associated therewith and reducing the differential thermal expansions and distortions of the said table and parts.

3. An improvement in the manufacture of glass plates which consists in the alternate bidirectional rolling of a series of masses of molten material on the opposing faces of a reversible table in such order that successive sheets are spread in opposite directions and on opposite sides of the said table, and removing each sheet from the said table before it is reversed, thereby equalizing the heating of the glass forming surfaces and the parts adjacent thereof.

4. The method of reducing the differential warping of the faces of a glass rolling table and its associated parts which comprises the equalization of the surface temperatures thereof by the spreading of successive masses of molten material in alternately reversed directions on the opposite sides of the said table, and removing each spread mass by sliding it longitudinally therefrom in the direction opposite to that in which it was rolled.

5. The method of maintaining the parts of a glass spreading mechanism at a substantially equalized temperature by spreading successive masses of the molten material in alternately reversed directions on alternately presented sides of an invertable rolling table and removing each sheet therefrom in the reverse direction to that in which it is spread thereon.

6. An improvement in the manufacture of rolled glass plates which comprises, the substantial equalization of the surface heating of the rolling tables by teeming or depositing successive molten masses alternately at opposite ends and on opposite sides of the said tables and spreading these masses successively thereon in alternately reversed directions, removing each plate from the table as soon as it is rolled, and maintaining the said table in its last rolling position for a substantial interval before inverting it.

7. An improvement in the manufacture of sheet glass which comprises the equitable distribution of the heat transferred from the glass to the table support therefor by the spreading of successive masses of unformed molten material in alternately reversed directions and on opposite sides of the said table and removing each spread sheet therefrom in the reverse direction to that in which it is formed.

8. An improvement in the manufacture of rolled glass plates which comprises the equitable distribution of the heat transferred from the glass to the rolling table, by spreading successive masses of molten material alternately on opposite sides thereof, and the symmetrical abstraction of such heat from the interior of said table.

9. The method of concurrently reducing the thermal distortion and the surface temperatures of a glass rolling table, which comprises the equalization of the heating conditions on the opposing faces thereof and the symmetrical cooling of the said faces by the removal of heat from the intermediate interior portions of the table.

10. The method of reducing the thermal distortion and surface temperatures of a glass rolling table which comprises the equalization of heat transfer to the opposite sides of the said table and the concurrent symmetrical cooling of the intermediate portions thereof.

11. An improvement in the manufacture of rolled glass plates which comprises the equitable and symmetrical heating and cooling of the two sides of the rolling table, by the spreading of successive masses of molten material in opposite directions and on opposite faces thereof, and the abstraction of heat from the interior portions of the table in the intervals between the bidirectional rolling operations.

12. The method of equalizing and reducing the surface heating of a glass rolling table which comprises the spreading of successive masses of molten glass alternately in opposite directions and on opposite sides of the table, and passing successively reversed currents of cooling fluid through the interior thereof substantially as described.

13. An improvement in the manufacture of rolled glass plates which comprises the teeming of successive masses of molten material alternately on opposite ends and opposite sides of a reversible table, the rolling out of the said masses to sheet form thereon and the intermediate symmetrical cooling of the interior of the table by successively reversed currents of cooling fluid flowing therethrough in the direction in which the last formed sheet was spread, thereby establishing substantial uniformity in the average temperature conditions on the two glass receiving and supporting surfaces of the table.

14. An improvement in the manufacture of glass plates which comprises the spreading of successive masses of molten material alternately in opposite directions and on opposite sides of a reversible rolling table, thereby maintaining both faces thereof at substantially the same average temperature, and passing each sheet thus formed into a heating or annealing chamber with the first shaped or colder end of the sheet in advance, thereby expediting and improving the annealing action of the said chamber.

15. The method of forming glass plates which consists in depositing masses of molten material alternately on oppoiste ends and on opposite sides of a reversible rolling table, spreading the said masses to sheet form thereon, and passing the finished sheets in continued and alternate order into and through a plurality of annealing lehrs.

16. The method of forming sheets of glass which comprises the depositing of a series of masses of unformed molten material alternately on opposite sides and at the opposite ends of a reversible rolling table, spreading these masses to sheet form thereon, passing the said sheets in reciprocative order into a plurality of lehr chambers, and symmetrically cooling the rolling table in the intervals between successive sheet formations by alternately reversed currents of cooling fluid.

17. An improvement in the manufacture of glass plates, which comprises the spreading of successive sheets on the opposite sides of a Janus faced reversible table and the alternate movement of the said sheets in reciprocative order to and through the receiving chambers of a multiple continuous lehr system thereby increasing the period of rest in each annealing station as compared with the interval between successive sheet formations.

18. The process of forming glass plates or sheets which comprises the alternate spreading of successive sheets in opposite directions on the opposite sides of a reversible rolling table, and the alternate or reciprocative delivery of the sheets thus formed to a series or plurality of continuous annealing lehrs with the first shaped or colder end of each sheet in advance.

19. An improvement in the manufacture of sheets or plates of vitreous material, which comprises the spreading of successive masses of the said material on the alternately presented faces of a reversible rolling table, the movement of the said sheets in ordered succession to and through a plurality of continuous annealing lehrs, and the arrest or detention of each sheet in the separate annealing chambers of each lehr for a period greater than the interval between successive spreading operations.

20. An improvement in the manufacture of sheet glass articles which comprises the alternate delivery of masses of molten material at the opposite ends of a Janus faced rolling table, the rolling out of said masses to sheet form on the upper surface thereof, the delivery of the rolled out sheets in predetermined successive order to a plurality of continuous annealing lehrs, the arrest of each sheet in the successive annealing ovens or station of each lehr for a period greater than the interval between rolling operations, and the reversal of the rolling table at substantially regular intervals so as to successively expose the opposite faces thereof to the action of the molten material, and thereby equitably distribute the heating effects of the hot glass on the said surfaces.

21. The process of making rolled glass plates or sheets which comprises the spreading of successive masses of unformed molten material on a single rolling table, and the movement of the rolled out sheets in predetermined and regular succession to and through a plurality of continuous lehrs, thereby increasing the period of rest in each annealing station of each lehr as compared with the interval between successive sheet forming operations.

22. An improvement in the manufacture of glass sheets which comprises the spreading of successive masses of molten material on a plurality of alternately presented supporting surfaces and the movement of the sheets thus formed to and through a series of annealing lehrs in continued reciprocative order whereby the sheet forming operations may be carried on without interruption from or interference with the necessary rest periods in the annealing chambers.

23. The process of making sheet glass articles which comprises the periodic spreading of successive sheets on a single rolling table, the continued systematic movement of said sheets in predetermined order to and through the chambers of a plurality of annealing lehrs, the arrest or detention of each sheet in the said chambers for a period greater than the intervals between successive sheet formations and the intermittent cooling of the rolling table during such intervals by currents of cooling fluid, whereby the course of the successive spreading operations is greatly accelerated without reducing the rest periods in the annealing operations.

24. The method of accelerating the production of sheet glass plates which consists in depositing a mass of molten material at one end of a Janus faced table, spreading it to sheet form thereon, moving the spread sheet into the receiving chamber of a continuous lehr, inverting the table, depositing another mass of molten material on the opposite end thereof, spreading this second mass into sheet form in the reverse direction thereon, moving this reversely spread sheet into another continuous lehr, inverting the table again and repeating the above enumerated sequence of steps substantially as described.

25. An improvement in the manufacture of glass plates or sheets which comprises the spreading of the molten material in alternately reversed directions, and on alternately presented sides of a reversible rolling table, the passing of the said sheets in reciprocative periodic order into a plurality of continuous annealing lehrs with the first formed end of each sheet in advance, the subsequent arrest of each sheet in the various ovens of the multiple lehr system for periods greater than the intervals between successive spreading operations and the symmetrical cooling of the rolling table surfaces by alternately reversed currents of cooling fluid that flow in the same direction as that in which the last formed sheet was spread, whereby the thermal distortions of the rolling table surfaces are greatly reduced and the production of successive sheets is greatly accelerated without reducing the necessary rest periods in the annealing operations.

26. An improvement in the manufacture of pressed glass plates which comprises the spreading of a succession of unformed molten masses, alternately in opposite directions on opposite faces of a reversible rolling table, thereby equalizing the heating effect of the glass on the opposed surfaces of the table and substantially removing the thermal distortion and warping of the glass supporting surface, passing the said sheets so formed and supported to a pressing mechanism, and there subjecting them to the action of a figuring die in such rapid succession as to maintain the said die at the proper working temperature without the addition of any heat other than that transferred from the glass itself, and then delivering the pressed sheets in periodic reciprocative order to a plurality of lehrs, whereby the interval between successive rolling and pressing operations may be greatly reduced without shortening the necessary rest period of the annealing operations.

27. The method of forming pressed plate products which comprises the forming of successive sheets by rolling out masses of unformed molten material in alternately reversed directions on alternately presented faces of a reversible rolling table and symmetrically abstracting heat from the interior portion thereof by successively reversed currents of cooling fluid flowing therethrough, transferring the said sheets to a press mechanism and there subjecting them to the action of a finishing die in such rapid succession as to maintain the said die at the most effective working temperature without any additional or intermediate heating thereof, passing the pressed and finished sheets in predetermined order into a series of independently controlled lehrs with the first formed end of each sheet in advance, and arresting each sheet in the various annealing chambers of the said lehrs for periods greater than the intervals between successive rolling and pressing operations, thereby improving the quality and greatly increasing the output of the product from one machine.

28. The herein described method of producing pressed plate glass which consists in the rolling out of successive masses of molten material on a plurality of alternately presented supporting surfaces, subjecting the rolled out sheets to the action of a press die in such rapid succession as to maintain said die at its most effective working temperature by the heating effect of the glass alone, and then transferring the pressed sheets in periodic reciprocative order to a plurality of annealing lehrs, whereby the rest period in each lehr can be independently controlled without interrupting the substantially continuous course of rolling and pressing operations.

29. An improvement in the manufacture of pressed glass plates which comprises the formation of successive sheets on a plurality of alternately presented supporting surfaces, the passing of these sheets under a press die with the first formed ends thereof in alternately reversed position, the pressing of the said sheets in such rapid succession as to maintain said die at its most effective working temperature by the heating effect of the glass alone, and the transfer of the pressed sheets in predetermined order to a series of independently controlled annealing lehrs, thereby permitting the sheet forming operations to proceed without interruption from, or interference with, the necessary rest periods of the annealing operations.

30. The method of maintaining the dies of plate pressing apparatus at a uniform and effective working temperature which comprises the rolling of successive masses of molten material on a plurality of alternately presented supporting surfaces, the transfer of the sheets so formed in continuous succession to a press mechanism with the colder ends thereof in alternately reversed position, and the pressing of the said sheets in such rapid sequence as to symmetrically heat the said dies to the required temperature by contact with the glass alone, thereby eliminating the carbonization and oxidation of the die surfaces, and increasing the speed of the rolling-pressing operations.

31. The process of manufacturing pressed plate products which comprises the alternate bidirectional spreading of successive masses of molten material on a plurality of alternately presented cooperative table surfaces, the passing of these successively spread sheets under a press die with the first formed or colder ends thereof in alternately reversed position, the pressing of the said sheets in such rapid order as to maintain the said die at its most effective working temperature by heat transfer from the glass alone, and the cooling of the rolling surfaces in the intervals between the spreading operations by currents of cooling fluid flowing in the same direction as that in which the last formed sheet was spread, thereby concurrently improving the quality of the product and greatly accelerating the course of the rolling-pressing operations.

32. An apparatus for the manufacture of glass plates comprising a reversible glass receiving table, means for spreading a succession of glass plates thereon in alternately reversed directions, and a plurality of continuous annealing lehrs adapted to receive the said plates in regular rotation.

33. An apparatus for sheet glass manufacture which comprises a Janus faced rolling table, means for rolling out a series of glass plates thereon in periodically reversed directions, means for inverting the said table at regular intervals, and means for maintaining an alternately reverted flow of cooling fluid through the table between successive sheet forming operations.

34. In apparatus for sheet glass manufacture the combination of a Janus faced reversible rolling table, means for spreading a succession of glass sheets thereon in alternately reversed directions, means for maintaining an alternated flow of cooling fluid through the table in the direction in which the last formed sheet was spread, and a plurality of annealing lehrs arranged and adapted to receive the successively formed sheets in periodic rotation.

35. In apparatus of the class described, the combination of a composite Janus faced table, means for depositing masses of molten glass alternately at opposite ends of the said table, means for spreading said molten masses into sheet form thereon, means for inverting the table between successive rolling operations, means for passing successively reversed currents of cooling fluid through the table in the direction in which the last formed sheet was spread, and means for delivering the sheets in periodic rotation to a plurality of annealing lehrs with the first formed end of each sheet in advance.

36. In apparatus of the class described the combination of a plurality of glass receiving and supporting surfaces and means for spreading a succession of glass sheets thereon in periodic rotation, with a plurality of continuous annealing lehrs and means for delivering the said sheets thereto in cyclic order with the first formed end of each sheet in advance.

37. In apparatus for the manufacture of glass sheets the combination of a table provided with a plurality of glass receiving surfaces, a spreading roll mounted above the table, means for moving the table so as to bring each of its receiving surfaces into cooperative relation with the spreading roll, means for maintaining a predetermined spaced relationship between the cooperating roll and table surfaces during the relative spreading movement of the one with respect to the other, and means for cooling each of the glass receiving surfaces by currents of cooling fluid flowing in the same direction as that in which the glass sheets are spread thereon.

38. An apparatus for the manufacture of sheet and plate glass which comprises a composite table provided with a plurality of glass receiving and supporting surfaces, a spreading roll mounted above said table, means for moving the table so as to bring any one of its receiving surfaces into cooperative relation with the said roll, means for maintaining a predetermined spaced relationship between the cooperating roll and table surface during the spreading movement of these parts, and means for cooling each of the receiving surfaces by currents of cooling fluid flowing in the direction in which the glass was spread thereon, together with a plurality of lehrs arranged and adapted to receive in cyclic order the successive sheets of glass spread on the said receiving surfaces substantially as described.

39. An apparatus for the manufacture of pressed plate products which comprises in combination a composite table provided with a plurality of glass receiving surfaces, means for spreading successive sheets of glass in cyclic order on the said surfaces, means for pressing the sheets thus successively produced, and means for transferring the pressed plates to a plurality of annealing lehrs arranged to receive said plates in periodic rotation.

40. In apparatus for the manufacture of pressed glass plates the combination of a plurality of glass supporting surfaces and means for spreading sheets of molten material thereon in cyclic order and in successively reversed directions, and means for abstracting the heat from said surfaces by alternating currents of fluid flowing in the direction in which the last formed sheet was spread, with a single press die arranged to refigure the surfaces of the successively formed sheets and a plurality of lehrs arranged and adapted to receive the pressed plates in periodic rotation.

41. In apparatus for the manufacture of pressed glass plates the combination of means for forming a series of molten glass sheets in periodic succession with a pressing mechanism therefor which comprises a pressing die yieldingly supported by a plurality of pneumatic cylinders and means for admitting compressed air successively to the opposite ends of the said cylinders to provide an equalized reaction cushion during the pressing operation and a retarded relief cushion in the subsequent separation of the die from the glass.

42. An apparatus for the manufacture of pressed plate products which comprises a table provided with a plurality of glass receiving surfaces, means for spreading a series of molten glass sheets thereon in cyclic order, means for transferring said sheet to a pressing mechanism with the first formed ends thereof in alternately reversed position, and a pressing die yieldingly supported by the plurality of double acting pneumatic cylinders adapted to provide a balanced reaction pressure cushion during the pressing operation and a retarded relief cushion during the subsequent parting of the glass and die surfaces.

43. An apparatus for the manufacture of pressed glass plates comprising a Janus faced reversible rolling table, means for spreading glass sheets successively in opposite directions and on opposite faces of the said table, a press mechanism provided with a pressing die yieldingly supported by a plurality of double acting interconnected cylinders, and means for passing the successively formed sheets under said pressing die with the first formed ends thereof alternately turned in opposite directions, in combination with a plurality of annealing lehrs and means for transferring the pressed plates thereto in cyclic rotation, whereby the interval between successive rolling and pressing operations may be greatly reduced without shortening the rest period in the annealing operations.

44. In apparatus for the manufacture of pressed plate glass the combination of a reversible Janus faced rolling table, a spreading roll, means for maintaining a spaced vertical relationship between the cooperating roll and table surfaces during the relative movement thereof in the spreading operations, means for varying said spaced relationship between the spreading of successive sheets, means for passing currents of cooling fluid through the table in the direction in which the sheets are rolled thereon, and a pressing die yieldingly supported by a plurality of interconnected pneumatic cylinders and adapted to automatically adjust itself to parallelism with the surface of the rolled out glass sheets when the latter are brought in contact therewith and to subject the said sheets to a uniformly distributed reaction pressure over the entire area thereof.

45. An apparatus for the manufacture of pressed glass sheets comprising means for spreading successive sheets of glass on a plurality of alternately presented table surfaces, means for cooling said surfaces by currents of cooling fluid flowing in the direction in which successive sheets are spread, means for presenting said sheets in succession to the action of a pressing die, means of yieldingly supporting said die to secure its automatic adjustment to parallelism with the surface of each sheet and to subject the latter to a uniformly distributed reaction pressure over the entire area thereof, in combination with a plurality of lehrs and means for transferring the successively formed sheets thereto in cyclic order, substantially as described and for the purposes specified.

46. In an apparatus for the manufacture of pressed plate products the combination of a composite Janus faced rolling table, means for moving said table longitudinally in either direction, means for reversing said table on an axis parallel to its opposing faces, a spreading roll capable of vertical movement with respect to the table, means for maintaining the said roll at a fixed distance from the uppermost table surface during the longitudinal movement of the latter, means for automatically establishing a flow of cooling fluid longitudinally of the table when the said member reaches the extremes of its longitudinal movement, a pressing die arranged above the plane of said movement and intermediate of the end limits thereof, a yielding support for said die consisting of interconnected elastic cushion members adapted to equitably distribute any pressure thereon over the entire area thereof, together with a plurality of annealing lehrs and means for transferring the pressed glass plates to the said lehrs in periodic rotation.

47. An apparatus for the manufacture of glass plates comprising a reversible rolling table, means for depositing masses of molten glass on either end of the said table, means for spreading said masses to sheet form thereon, means for passing a stream of cooling fluid through the table in either direction and means for reversing said table without interfering with the flow of said cooling fluid.

48. In apparatus of the class described the combination of a Janus faced table, means for depositing masses of molten glass at either end of said table, means for rolling out said masses to sheet form in alternately reversed directions thereon, means for reversing the table between successive rolling operations so as to reciprocally expose the opposite faces thereof to the heating effects of the molten glass, means for symmetrically cooling said faces by currents of cooling fluid flowing in the direction in which the last formed sheet was spread, means for pressing the successive sheets while they are supported on the alternately presented table surfaces and means of transferring the pressed plates from the said supporting surfaces to a plurality of lehrs each of which comprises a connected series of annealing chambers.

In testimony whereof I have hereunto set my hand.

FRANK L. O. WADSWORTH.

Witness:
J. M. GEOGHEGAN.